United States Patent
Linehan et al.

(10) Patent No.: US 11,270,043 B2
(45) Date of Patent: Mar. 8, 2022

(54) SYSTEM AND METHOD FOR MODELING, SIMULATION, OPTIMIZATION, AND/OR QUOTE CREATION

(71) Applicant: INGERSOLL-RAND INDUSTRIAL U.S., INC., Davidson, NC (US)

(72) Inventors: John J. Linehan, Jamison, PA (US); Kelly Glenn Campbell, Davidson, NC (US); Ryan D. Hartman, Huntersville, NC (US); Nicholas Able, Huntersville, NC (US); Eric W. Seidel, Davidson, NC (US); Chun Jian Tang, Annandale, NJ (US)

(73) Assignee: INGERSOLL-RAND INDUSTRIAL U.S., INC., Davidson, NC (US)

( * ) Notice: Subject to any disclaimer, the term of this patent is extended or adjusted under 35 U.S.C. 154(b) by 14 days.

(21) Appl. No.: 16/519,530

(22) Filed: Jul. 23, 2019

(65) Prior Publication Data
US 2020/0089824 A1 Mar. 19, 2020

Related U.S. Application Data

(63) Continuation of application No. 14/614,349, filed on Feb. 4, 2015, now Pat. No. 10,394,970.
(Continued)

(51) Int. Cl.
*G06Q 30/06* (2012.01)
*G06F 30/20* (2020.01)
(Continued)

(52) U.S. Cl.
CPC .............. *G06F 30/20* (2020.01); *G05B 13/04* (2013.01); *G05B 13/042* (2013.01); *G05D 16/20* (2013.01); *G06F 17/10* (2013.01); *G06Q 10/20* (2013.01); *G06Q 30/0627* (2013.01); *G06Q 30/0631* (2013.01); *G06Q 30/0641* (2013.01); *G06F 2111/06* (2020.01)

(58) Field of Classification Search
None
See application file for complete search history.

(56) References Cited

U.S. PATENT DOCUMENTS

| 6,341,996 B1* | 1/2002 | Brien ................. G05B 19/4069 451/8 |
| 2006/0090152 A1* | 4/2006 | Lin ........................ G06F 30/00 716/102 |

(Continued)

OTHER PUBLICATIONS

D. Benson, "Simulation Modeling And Optimization Using Promodel," Winter Simulation Conference Proceedings,, Atlanta, GA, USA, 1997, pp. 587-593, doi: 10.1109/WSC.1997.640923. (Year: 1997).*

*Primary Examiner* — Michelle T Kringen
(74) *Attorney, Agent, or Firm* — Kevin E. West; Advent, LLP

(57) ABSTRACT

A computer may display on a graphical user interface (GUI) a component library including a set of components relating to a compressed air system. The GUI may have a modeling interface for configuring a virtual model using the set of components. The computer may simulate the virtual model to determine one or more optimizations to the compressed air system. The computer may also determine the cost of implementing the compressor system optimization.

20 Claims, 7 Drawing Sheets

Related U.S. Application Data

(60) Provisional application No. 61/935,807, filed on Feb. 4, 2014.

(51) Int. Cl.
*G05B 13/04* (2006.01)
*G06F 17/10* (2006.01)
*G05D 16/20* (2006.01)
*G06Q 10/00* (2012.01)
*G06F 111/06* (2020.01)

(56) References Cited

U.S. PATENT DOCUMENTS

| | | | | |
|---|---|---|---|---|
| 2008/0263469 A1* | 10/2008 | Nasle | ............ | G06F 8/38 |
| | | | | 715/771 |
| 2009/0300544 A1* | 12/2009 | Psenka | ............ | H04L 63/10 |
| | | | | 715/810 |
| 2012/0232879 A1* | 9/2012 | Iyengar | ............ | G06F 30/20 |
| | | | | 703/21 |
| 2015/0066442 A1* | 3/2015 | Pryor | ............ | G06Q 10/10 |
| | | | | 703/1 |
| 2016/0032918 A1* | 2/2016 | Wagner | ............ | F04D 25/16 |
| | | | | 417/53 |

* cited by examiner

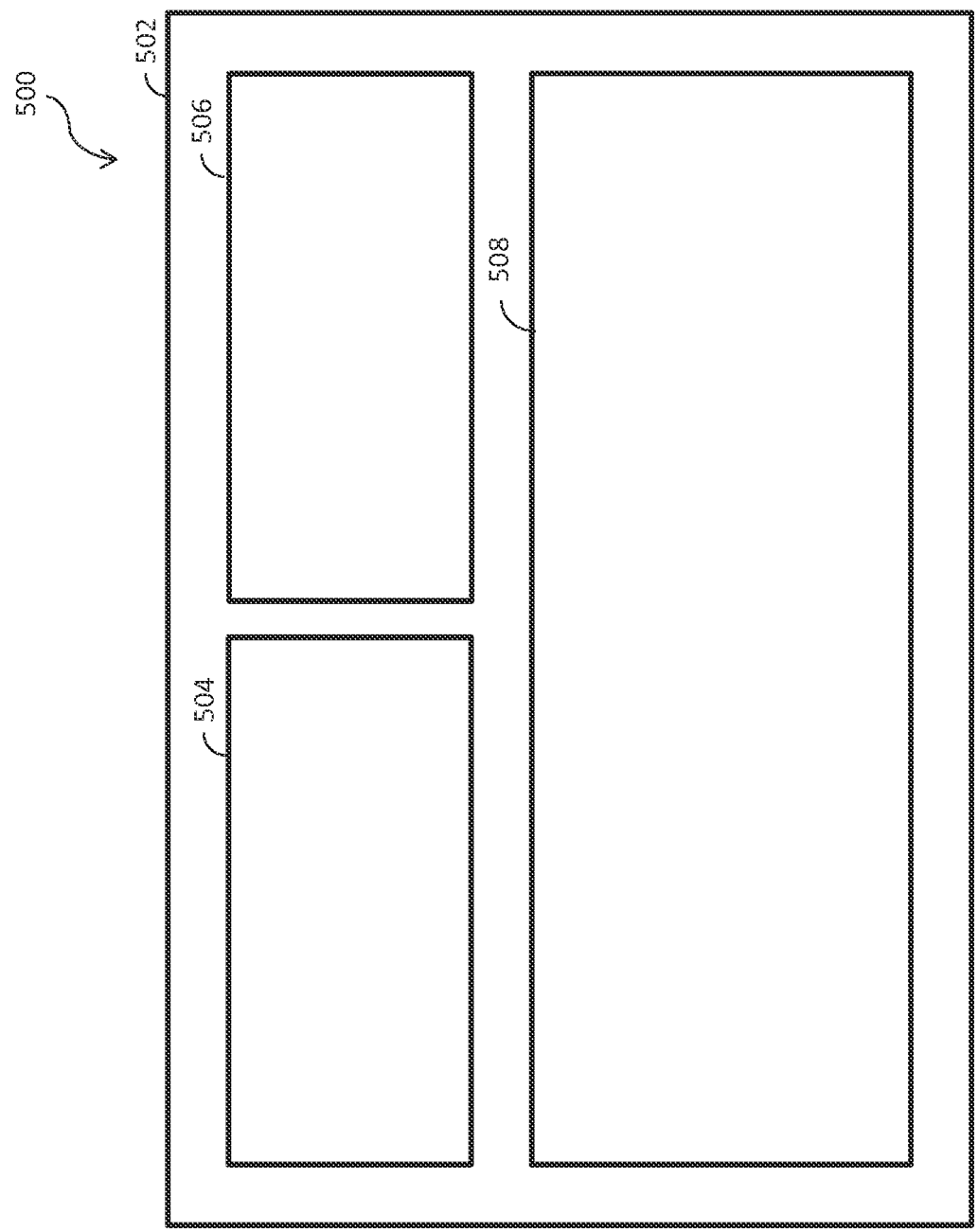

SYSTEM AND METHOD FOR MODELING, SIMULATION, OPTIMIZATION, AND/OR QUOTE CREATION

CROSS REFERENCE TO RELATED APPLICATIONS

The present application is a continuation of U.S. patent application Ser. No. 14/614,349 filed on Feb. 4, 2015, which claims the benefit of U.S. Provisional Patent Application No. 61/935,807, filed on Feb. 4, 2014, U.S. Provisional Patent Application No. 61/943,131, filed on Feb. 21, 2014, U.S. Provisional Patent Application No. 61/943,146, filed on Feb. 21, 2014, U.S. Provisional Patent Application No. 61/943,152, filed on Feb. 21, 2014, and U.S. Provisional Patent Application No. 61/943,149, filed on Feb. 21, 2014, all of which are hereby incorporated by reference in their entirety.

BACKGROUND

The present invention generally relates to modeling, simulating, optimizing, and/or generating a quote for a system such as a compressed air system. A compressed air system in a facility typically includes many components, such as one or more compressors, dryers, tanks, pipes, and/or regulators. Compressed air systems are typically designed to provide compressed air at a desired flow rate, pressure, temperature, and quality at a high efficiency to minimize energy consumption. Some existing systems have various shortcomings relative to certain applications. Accordingly, there remains a need for further contributions in this area of technology.

SUMMARY

One embodiment of the present invention is a unique system and method for modeling, simulation, optimization, and/or quote creation. Other embodiments include apparatuses, systems, devices, hardware, methods, and combinations for modeling, simulation, optimization, and/or quote creation. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein:

FIG. 5 is a schematic block diagram of an exemplary feedback GUI.

DETAILED DESCRIPTION OF ILLUSTRATIVE EMBODIMENTS

Figure 1:
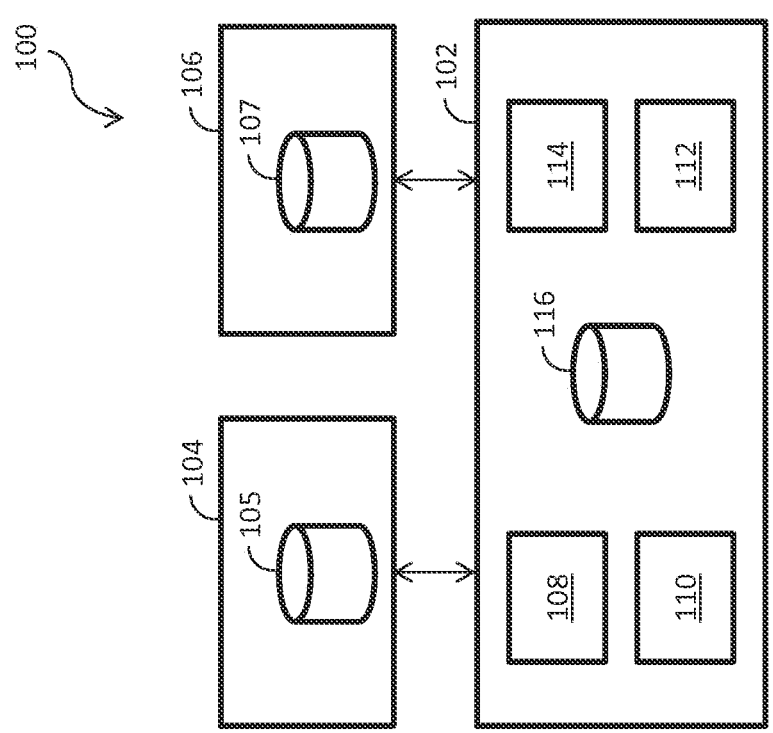
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an exemplary system 100, which includes a computer 102, a model server 104, and a sales quote server 106. Each of the model server 104 and the sales quote server 106 in operable conjunction with a sales quote database 107 may communicate with the computer 102 remotely over the Internet and/or other data networks known in the art. It is contemplated that the model server 104 and the sales quote server 106 may be of any server type configurable to communicate with the computer 102. While the model server 104 and the sales quote server 106 are each shown as separate single servers in FIG. 1, it is contemplated that in certain embodiments the model server 104 and the sales quote server 106 may each be combined into a single server or may each be comprised of multiple servers.

The system 100 is directed to a compressed air system. However, it is contemplated that the embodiments and/or features of the present application may be applied to any other type of system other than compressed air systems.

The computer 102 may be any type of computer such as a desktop computer, laptop computer, server, tablet computer, smartphone, and the like. The computer 102 may include a number of modules providing a number of functionalities. A module may be implemented as operations by software, hardware, artificial intelligence, fuzzy logic, or any combination thereof, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or in part with other modules or devices. The operations of any module may be performed wholly or partially in hardware/software or by other modules. The presented organization of the modules is exemplary only, and other organizations, configurations and arrangements are contemplated.

The model server 104 is structured to store information in a database 105 at the model server 104 or other remote database server. The database 105 may store a compressed air system component library that may include digital representations or computer model definitions of compressed air system components, such as one or more compressors, dryers, tanks, pipes, regulators, and the like. It is contemplated that in certain embodiments the compressed air system component library may be maintained in a secure environment, the secure environment only allowing access, for example, when credentials have been input and validated. The computer 102 may include an application which, upon start-up of computer 102, will log into the model server 104 using, for example, an administrator name, location, contact information, password, and/or any other information. The database 105 may further include but are not limited to system generation, automation, and/or instructions, performance or fluid dynamic maps, data curves, parameter lookup tables, flow rates, temperatures, pressure control settings, speeds, efficiencies, and/or other parameters for each of the compressed air system components. The set of parameters may include proportional-integral-derivative (PID) controller settings and/or various control algorithms for each of the compressed air system components, when applicable.

The computer 102 includes a modeling module 108 configured to request and receive at least a portion of the compressed air system component library from the database 105 at the model server 104 via the Internet, for example. The compressed air system component library may be requested automatically by the computer 102 or when requested or selected by a user of the computer 102. The modeling module 108 may be further configured to communicate with a graphical user interface (GUI) that allows a user to configure a compressed air system model using the compressed air system components from the compressed air system component library, such as a modeling GUI 402, which is discussed in further detail in the description of FIG. 4.

The computer 102 includes a simulation module 110 configured to receive and interpret the compressed air system model including component parameters from the modeling module 108 and perform one or more simulations on the compressed air system model based on one or more system parameters. The system parameters may include a pressure, a flow, a relative humidity, a temperature, an energy consumption, and/or other parameters.

In certain embodiments, the simulation module 110 may be further configured to predict and/or diagnose compressed air system component failures by comparing real-time monitoring data to a real-time simulation, which may allow for preventive maintenance troubleshooting, root-cause analysis, and/or back solving for desired system parameters. The computer 102 may receive the real-time monitoring data from various sources such as being input from a user manually or via a portable storage drive, download the real-time monitoring data from the server 104, or receive the real-time monitoring data electronically from a remote location. In certain other embodiments, the simulation may be performed using one or more geometrical and/or performance parameters from each component in the compressed air system model to model transient and dynamic pressure, flow, moisture content, energy consumption, and/or the like through the compressed air system model. The computer 102 may provide the results of any preventive maintenance troubleshooting, root-cause analysis, and/or back solving to a customer or third party in a report via email, stored in the model server 104 or the sales quote server 106, displayed on a GUI 400 of the computer 102, and/or communicated by any other electronic means as known by those skilled in the art. Furthermore, it is contemplated that the real-time monitoring data from a previous installation or other facility may be used in a different installation or facility.

The simulation module 110 may be further configured to determine reliability. In certain embodiments, the reliability may include installation reliability and/or design reliability. The installation reliability may use real-time data, historical data, and/or predictive simulation to determine the reliability of an existing compressed air system. The design reliability may use historical data from like compressed air systems to determine the reliability of a virtual compressed air system and/or known performance parameters derived from the simulation, like cycle rate, pressure, moisture content which influence reliability. In certain embodiments an acceptable reliability setting may be set by the user, such as by a GUI, for example. The acceptable reliability may be based on a total cost of ownership (TCO), a performance metric, and/or other costs. In one non-limiting example, the reliability would be based on having minimized up-front costs which may allow the user to improve the system based on the reliability by changing the control strategy and/or adding or replacing equipment in the system.

The simulation module 110 may also include an intelligent solution or convergence control to prevent the user and/or customer from experiencing problems when running simulations of varying complexity. In particular, there are at least two types of parameters that are referred to as solution control. Those are the time step and the convergence criteria which in one embodiment can include a group of 15 individual settings. Solution control settings may impact the accuracy, stability, and computation time of simulations. The way in which solution control is handled in the system generally should be user friendly and intuitive, but also flexible to handle a wide range of use cases. A modeling program such as Flowmaster may be used with the system 100; however, other modeling programs are contemplated.

The time step is the increment in which the simulation proceeds through time. For example, if a time step of 0.1 seconds is selected, a calculation generally will occur every 10th of a second until the simulation runs to completion. The smaller the time step generally the more accurate and more stable a given simulation will be but the cost generally will be computation time. The opposite is generally true for a larger time step. In one embodiment, to conserve computation time when a smaller time step is used, the results may be written only once per second. To make setting the time step easier for the user, four time steps and corresponding write intervals have been identified for conducting analyses as shown in table 1 below.

TABLE 1

Time Step & Results File Write Interval Table
Time Step & Results File Write Interval

|  | TS1 | TS2 | TS3 | TS4 |
|---|---|---|---|---|
| Time Step (S) | 0.5 | 0.25 | 0.1 | 0.05 |
| Results File Write Interval | 2 | 4 | 10 | 20 |

The convergence criteria, which is a combination of various parameters such as the ones shown below in table 2, also may affect the simulation accuracy, stability, and computation time. To make selecting these parameters easier for the user, predefined values for all parameters have been broken out into four "buckets". As buckets increase from one to four, the convergence criteria generally moves from loose to tight.

TABLE 2

Convergence Criteria Table
Convergence Criteria

| Property | Bucket 1 | Bucket 2 | Bucket 3 | Bucket 4 | Units |
|---|---|---|---|---|---|
| Pressure Tolerance | Loose Tolerance | Slightly Tighter Tolerance | Tighter Tolerance | Tightest Tolerance | |
| Flow Tolerance | | | | | |
| Weighting Factor | | | | | |
| Controller Tolerance | | | | | |
| Controller Weighting Factor | | | | | |

A combination of time step and convergence criteria (specifically a convergence criteria bucket) includes what is being referred to as a "solution control setting." These solution control settings are shown in Table 3. Computation time generally increases from solution control setting 1 to solution control setting 16. Simulation accuracy and stability generally increase from solution control setting 1 to solution control setting 16.

TABLE 3

Solution Control Setting Table

| Solution Control Setting | Time Step | Convergence Criteria Bucket |
|---|---|---|
| 1 | TS1 | Bucket 1 |
| 2 | TS1 | Bucket 2 |
| 3 | TS1 | Bucket 3 |
| 4 | TS1 | Bucket 4 |
| 5 | TS2 | Bucket 1 |
| 6 | TS2 | Bucket 2 |
| 7 | TS2 | Bucket 3 |
| 8 | TS2 | Bucket 4 |
| 9 | TS3 | Bucket 1 |
| 10 | TS3 | Bucket 2 |
| 11 | TS3 | Bucket 3 |
| 12 | TS3 | Bucket 4 |
| 13 | TS4 | Bucket 1 |
| 14 | TS4 | Bucket 2 |
| 15 | TS4 | Bucket 3 |
| 16 | TS4 | Bucket 4 |

It should be noted that the values shown in all of the tables are exemplary in nature and not to be construed as limiting in any way. The values will vary depending on the system to be analyzed.

The simulation module 110 may provide a solution control method to the user as a default setting in which the user does not have to adjust any of the previously discussed time step or convergence criteria settings. Generally, with the solution control setting should be adjusted (i.e., moving from solution control setting 1 to solution control setting 16) in an iterative loop until a successful simulation is reached.

To determine the initial solution control setting, the logic in Table 4 may be applied by the simulation module 110. If the answer to any of the questions is yes, the corresponding setting generally should be used as the initial setting. If more than one question in Table 4 is answered yes, then the highest corresponding starting solution control setting generally should be used.

TABLE 4

Determining Initial Simulation Control Setting

| Scenario (if the answer is yes apply the specified Simulation Control Setting) | Max Starting Solution Control Setting |
|---|---|
| Is there a VSD compressor in the system? | 5 |
| Is there more than 1 compressor of any type in the system? | 5 |
| Is there an intelliflow Valve in the system? | 5 |
| Does the flow demand vary? | 5 |
| Is this an advanced simulation? (header network included) | 9 |
| Is there more than 1 VSD compressors in the system? | 9 |
| Is there a centac compressor in the system? | 9 |
| Is there a two arm tank in the system? | 9 |
| IF ALL QUESTIONS ARE ANSWERED "NO" THE SOLUTION CONTROL SETTING SHOULD BE 1 | |

A successful solution generally is one that runs to completion with no errors (often warnings may be present, but are typically okay). An unsuccessful simulation occurs anytime the solution fails to initiate or fails to complete. In both cases some form of error message generally should be communicated from the system. Another way in which a simulation can be unsuccessful is when a monitored pressure gauge such as one denoted as P3 by the user (which may be a mandatory requirement) goes above a threshold pressure of 3447379 Pa (500 psi) in one example. If this occurs the simulation should be stopped and the next solution control setting in the loop should be set and the simulation re-run.

Figure 1A:
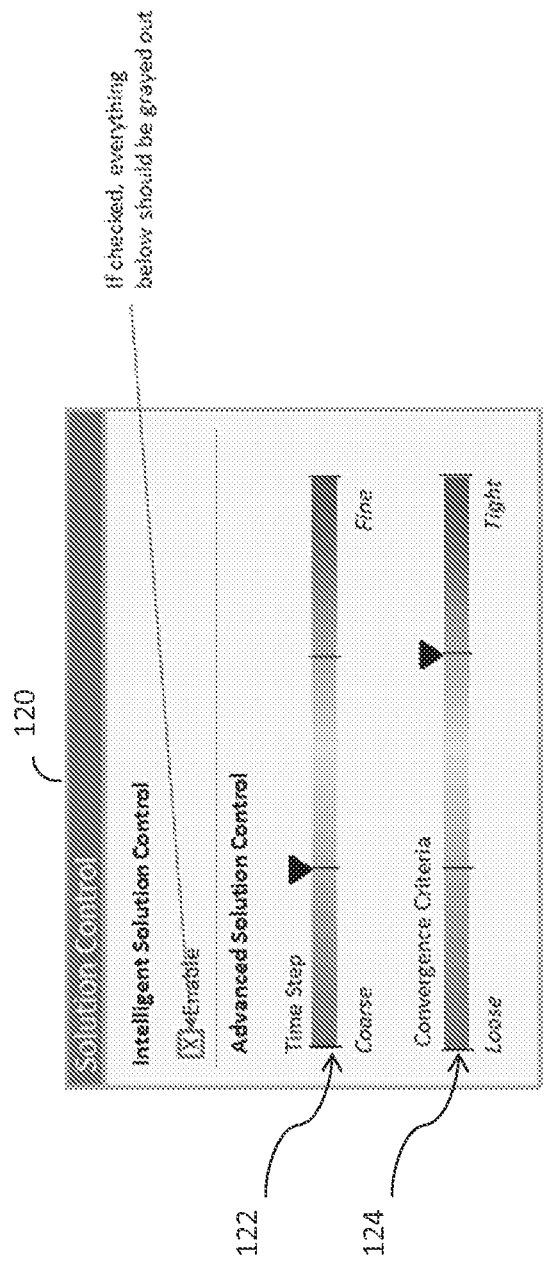
FIG. 1A is an exemplary GUI for adjusting solution control settings.

The simulation module 110 may also include an advanced solution control mode in which the user may have the ability to manually specify the time step and the convergence criteria. As seen in FIG. 1A, a GUI 120 provides a user two slider bars 122, 124 to adjust. The first slider bar 122 may have four settings and allow for adjustment of the time step. The second slider bar 124 may have four settings and allow for adjustment between the four convergence criteria buckets.

Figure 1B:
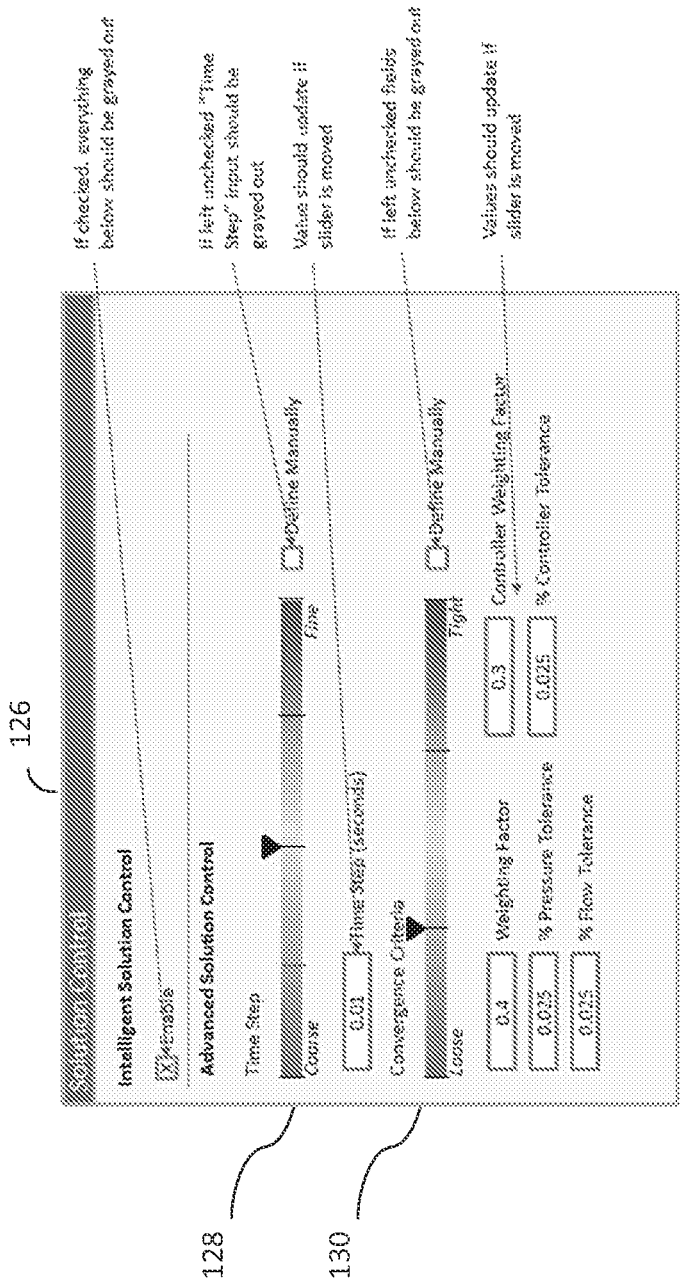
FIG. 1B is another exemplary GUI for adjusting solution control settings.

In another embodiment, another advanced solution control mode may allow the user to have the ability to specify the time step and certain convergence criteria parameters manually as seen in FIG. 1B, which illustrates a GUI 126 with a time step slide bar 128, a convergence criteria slide bar 130, and various other inputs for time step, weighting factor, pressure tolerance, flow tolerance, controller weighting factor, and/or controller tolerance.

The range for manual time step setting may be from TS1 and TS4 shown in Table 1 and the ranges for manual convergence criteria may be from defaults to Bucket 4 shown in Table 2.

The simulation module 110 may also include a variable speed drive (VSD) performance curve generator to simulate competitor or generic VSD rotary compressor. To simulate a compressor model, typically flow and power surfaces as well as maximum and minimum speed lines must be created. The following are examples variables of these surfaces and curves. Flow Surface: Independent Variables: Discharge Pressure (Pa) & Percent of Max Motor Speed (ratio); Dependent Variable: Volumetric Flow Rate (m^3/s). Power Surface: Independent Variables: Discharge Pressure (Pa) & Percent of Max Motor Speed (ratio); Dependent Variable: Volumetric Flow Rate (m^3/s). Max Speed Line: Independent Variable: Pressure (Pa); Dependent Variable: Percent of Max Motor Speed (ratio). Min Speed Line: Independent Variable: Pressure (Pa Dependent Variable: Percent of Max Motor Speed (ratio). The Percent of Max Motor Speed may be assumed to be proportional to flow rate such that the max flow rate of the machine will equal 100% motor speed; a flow rate of 80% of the max flow will be 80% motor speed and so on.

There are two scenarios in which flow and power surfaces can be created based on the different levels of information the user has regarding the compressor: advanced method and a basic method depending on the amount of data a user has about the machine and/or system. Calculations shown are in SI units, but may be in other units.

The inputs for the advanced method may include data for flow and power at a specified pressure, the maximum capacity of the compressor, the maximum operating pressure, and the minimum operating pressure as seen in Tables 5 and 6 below.

TABLE 5

Advanced Method Inputs

| Pressure 689464.9752 | | | Pressure 792884.7215 | | |
|---|---|---|---|---|---|
| Flow m^3/s | Speed ratio | Power W | Flow m^3/s | Speed ratio | Power W |
| 0.31385 | 1.000 | 114400.0 | 0.28600 | 0.911 | 115200.0 |
| 0.28208 | 0.899 | 104300.0 | 0.26165 | 0.834 | 104900.0 |
| 0.25400 | 0.809 | 93800.0 | 0.23744 | 0.757 | 95400.0 |
| 0.22559 | 0.719 | 83400.0 | 0.21389 | 0.682 | 86500.0 |
| 0.19713 | 0.628 | 73500.0 | 0.19034 | 0.606 | 77900.0 |
| 0.16834 | 0.536 | 63900.0 | 0.16664 | 0.531 | 69700.0 |
| 0.14111 | 0.450 | 55400.0 | 0.14394 | 0.459 | 62000.0 |

TABLE 6

Advanced Method Inputs

| | |
|---|---|
| Max Volumetric Flow Rate of Compressor (m^3/s) | 0.31385 |
| Max Operating Pressure (Pa) | 1137617.2090 |
| Min Operating Pressure (Pa) | 448152.2339 |

The first step in the advanced method may be to extrapolate the flow and power to the max and min operating pressures as seen in Table 7.

TABLE 7

Flow & Power Extrapolated Values

| Pressure 448152.2339 | | | Pressure 689464.9752 | | | Pressure 792884.7215 | | | Pressure 1137617.209 | | |
|---|---|---|---|---|---|---|---|---|---|---|---|
| Flow m^3/s | Speed ratio | Power W | Flow m^3/s | Speed ratio | Power W | Flow m^3/s | Speed ratio | Power W | Flow m^3/s | Speed ratio | Power W |
| 0.37882 | 1.207 | 112533.3 | 0.31385 | 1.000 | 114400.0 | 0.28600 | 0.911 | 115200.0 | 0.19318 | 0.616 | 117866.7 |
| 0.32977 | 1.051 | 102900.0 | 0.28208 | 0.899 | 104300.0 | 0.26165 | 0.834 | 104900.0 | 0.19353 | 0.617 | 106900.0 |
| 0.29265 | 0.932 | 90066.7 | 0.25400 | 0.809 | 93800.0 | 0.23744 | 0.757 | 95400.0 | 0.18222 | 0.581 | 100733.3 |
| 0.25290 | 0.806 | 76166.7 | 0.22559 | 0.719 | 83400.0 | 0.21389 | 0.682 | 86500.0 | 0.17487 | 0.557 | 96833.3 |
| 0.21299 | 0.679 | 63233.3 | 0.19713 | 0.628 | 73500.0 | 0.19034 | 0.606 | 77900.0 | 0.16768 | 0.534 | 92566.7 |
| 0.17231 | 0.549 | 50366.7 | 0.16834 | 0.536 | 63900.0 | 0.16664 | 0.531 | 69700.0 | 0.16098 | 0.513 | 89033.3 |
| 0.13451 | 0.429 | 40000.0 | 0.14111 | 0.450 | 55400.0 | 0.14394 | 0.459 | 62000.0 | 0.15338 | 0.489 | 84000.0 |

The first step is implemented using the equation for linear interpolation/extrapolation where pressure is the "x" variable and flow or power is the "y" variable. An example of this calculation is done for a flow of 0.29265 as shown below.

$$y = y_0 + (y_1 - y_0) * \left(\frac{x - x_0}{x_1 - x_0}\right) \quad (1)$$

$$y = 0.25400 + (0.23744 - 0.25400) * \left(\frac{448152.2339 - 689464.9752}{792884.7215 - 689464.9752}\right)$$

$$y = 0.29264$$

This process should be repeated moving up and down the columns until all values for flow and power are calculated. The "y" variable in the above equation is a flow value when extrapolating for flow and the "y" variable is a power value when extrapolating power, however, the same equation is to be used.

The second step of the advanced method is to calculate the speed as a percentage of max speed at every flow point. To calculate, simply take a given flow rate in Table 7 and divide it by the "Max Volumetric Flow Rate of Compressor" shown in Table 6. An example of this calculation for a speed of 0.581 is show below.

$$\text{Speed} = \frac{\text{Flow Rate}}{\text{Max Flow Rate}} \quad (2)$$

$$\text{Speed} = \frac{0.18222}{0.31385}$$

$$\text{Speed} = 0.581$$

This process should be repeated until all speeds shown in Table 7 are calculated.

Once Table 7 is completely calculated, the simulation module 110 may calculate the max and min speed line points shown below in Tables 8 and 9, respectively.

TABLE 8

Max Speed Line

| Pressure (Pa) | Speed (ratio) |
|---|---|
| 448152.2339 | 1.000 |
| 689464.9752 | 1.000 |

TABLE 8-continued

Max Speed Line

| Pressure (Pa) | Speed (ratio) |
|---|---|
| 792884.7215 | 0.911 |
| 1137617.2090 | 0.617 |

TABLE 9

Min Speed Line

| Pressure (Pa) | Speed (ratio) |
|---|---|
| 448152.2339 | 0.429 |
| 689464.9752 | 0.450 |
| 792884.7215 | 0.459 |
| 1137617.2090 | 0.489 |

The speeds are the maximum and minimum speeds calculated in step 2 for each given pressure. By using a "max" and "min" approach instead of using the value in row 1 and row 7 it allows for flexibility if the user only specifies 5 rows of data. However, if a speed calculated in step 2 exceeds a value of 1 it typically should be clipped down to 1 when defining the speed lines. This will typically happen at lower pressures such as 448152.2339 Pa in the case of this example where in Table the max speed at 448152.2339 Pa is 1.207 but when calculating the max speed line in Table 8 this value is clipped to 1.

Next the data calculated in the previous steps may be used by a modeling program to create the desired curves and/or surfaces. There may be an automation process for creating the curves and/or surfaces. The following are notes or settings for each curve/surface. Max Speed Line: 2D Curve, x-axis: Pressure (Pa); y-axis: Speed (as a ratio); Degree fit: Linear. Min Speed Line: 2D Curve; x-axis: Pressure (Pa); y-axis: Speed (as a ratio); Degree fit: Linear. Flow Surface: 3D surface; x-axis: Pressure (Pa); y-axis: Speed (as a ratio); z-axis: Volumetric Flow Rate (m^3/s); Degree fit: Linear. Power Surface: 3D surface; x-axis: Pressure (Pa); y-axis: Speed (as a ratio); z-axis: Power (W); Degree fit: 2nd Degree.

Turning to the basic method, typically the required inputs include pressure, max flow, and min flow. The optional inputs may include max power and min power. It is the combination of these optional inputs that make up the three different calculation options discussed below. Tables 10 and 11 illustrate these values.

TABLE 10

Inputs
Pressure
792884.7215

| Flow m^3/s | Speed ratio | Power W |
|---|---|---|
| 0.28600 | 0.911 | 115200.0 |
| 0.23865 | 0.760 | 97466.7 |
| 0.19130 | 0.610 | 79733.3 |
| 0.14394 | 0.459 | 62000.0 |

TABLE 11

Max and Min Inputs

| | |
|---|---|
| Max Volumetric Flow Rate of Compressor (m^3/s) | 0.31385 |
| Max Operating Pressure (Pa) | 1137617.2090 |
| Min Operating Pressure (Pa) | 448152.2339 |
| Turn Down Percent (ratio) | 0.497 |

Under option 1, the user specifies all mandatory inputs and the optional flow and power input for the specified pressure shown in Table 10. Under option 2, the user specifies all mandatory inputs and only the optional flow input for the specified pressure shown in Table 10. Under option 3, the user specifies all of the mandatory inputs and only the optional turn down percent in Table 11.

The first step of the process is to ensure all of the inputs, both mandatory and optional, are obtained. Since two of the values are optional they will need to be calculated if the user does not specify them. This step will now be broken out into the different options.

Under option 1, the user will have specified all of the highlighted inputs in Table 10 and no further calculations are needed. This step is complete.

Under option 2, the user has specified all of the inputs discussed above except the minimum power. The calculation for this and an example is shown below.

$$\text{Min Power} = \text{Max Power} * \left[ \left( \frac{\text{Min Flow}}{\text{Max Flow}} \right) + 0.04 \right] \quad (3)$$

$$\text{Min Power} = 115200.0 * \left[ \left( \frac{0.14394}{0.28600} \right) + 0.04 \right]$$

$$\text{Min Power} = 625866$$

Under option 3, the user has not specified the minimum flow or the minimum power but did specify the turn down percent. The first step will be to calculate the minimum flow. The calculation to do this is shown below.

Min Flow=(1−Turn Down Percent)*Max Flow

Min Flow=(1−0.497)*0.28600

$$\text{Min Flow} = 0.14386 \quad (4)$$

Next, the minimum power is calculated. With the knowledge of the minimum flow, the calculation used in option 2 can now be used here.

The remaining steps in the basic method are the same for all three options. In step 2 of the basic method, the maximum and minimum flow at the maximum and minimum specified pressures will be calculated.

TABLE 12

Pressure & Power Value Calculation

| Pressure 448152.2339 | | | Pressure 792884.7215 | | | Pressure 1137617.209 | | |
|---|---|---|---|---|---|---|---|---|
| Flow m^3/s | Speed ratio | Power W | Flow m^3/s | Speed ratio | Power W | Flow m^3/s | Speed ratio | Power W |
| 0.35439 | 1.129 | 115200.0 | 0.28600 | 0.911 | 115200.0 | 0.21761 | 0.693 | 115200.0 |
| 0.27997 | 0.892 | 92349.3 | 0.23865 | 0.760 | 97466.7 | 0.19732 | 0.629 | 105800.7 |
| 0.20555 | 0.655 | 69498.5 | 0.19130 | 0.610 | 79733.3 | 0.17704 | 0.564 | 96401.4 |
| 0.13114 | 0.418 | 44647.8 | 0.14394 | 0.459 | 62000.0 | 0.15675 | 0.499 | 87002.1 |

For calculating the max flow values the following equation with example may be used:

$$Flow_{1,max} = Flow_{2,max} * \left[\frac{(-0.00000064488882*Pressure_1 + 1.44100755353019)}{(-0.00000064488882*Pressure_2 + 1.44100755353019)}\right]$$ (5)

$$Flow_{1,max} = 0.28600 * \left[\frac{(-0.00000064488882*448152.2239 + 1.44100755353019)}{(-0.00000064488882*792884.7215 + 1.44100755353019)}\right]$$

$$Flow_{1,max} = 0.35439$$

For calculating the min flow values the following equation with example may be used:

$$Flow_{1,min} = Flow_{2,min} * \left[\frac{(0.000000264166015*Pressure_1 + 0.814079058709771)}{(0.000000264166015*Pressure_2 + 0.814079058709771)}\right]$$ (6)

$$Flow_{1,min} = 0.14394 * \left[\frac{(0.000000264166015*448152.2239 + 0.814079058709771)}{(0.000000264166015*792884.7215 + 0.814079058709771)}\right]$$

$$Flow_{1,min} = 0.13114$$

Step 4 of the basic method will be to calculate the maximum and minimum power at the maximum and minimum specified pressures. There is no calculation needed for the max power as should be the same for all specified pressures. The calculation for minimum power does require a calculation of which the equation and an example are shown below.

$$Power_{1,min} =$$ (7)
$$Power_{1,max} * \left[\left(\frac{Flow_{1,min}}{Flow_{1,max}}\right) + \left(\frac{Power_{2,min}}{Power_{2,max}}\right) - \left(\frac{Flow_{2,min}}{Flow_{2,max}}\right)\right]$$

$$Power_{1,min} = 115200.0 * \left[\left(\frac{0.13106}{0.35439}\right) + \left(\frac{62553.6}{115200}\right) - \left(\frac{0.14386}{0.28600}\right)\right]$$

$$Power_{1,min} = 47210.5$$

Step 5 of the basic method includes calculating the even linear spacing between the max and min flow and power, respectively, using equations known by those of ordinary skill in the art. The rest of the steps in the basic method are the same as those in the advanced method discussed above.

The simulation module 110 may be further configured to predict a centrifugal compressor transient surge. In simulating centrifugal compressors, the simulation module 110 may be configured to use models to predict a compressor's performance at any point in time and accounting for its interactions with the system it is installed in, which allows the user and customer to know where the compressor is on the performance map as it is installed in the compressed air system and how close the compressor is to surge. The tool also allows for prediction of these characteristics at different geographical locations (e.g., varying altitudes and temperatures) as well as seasonal changes (e.g., varying temperatures).

Generally, in centrifugal compressors, there are two phenomena that may limit the operating flow and pressure of the particular machine. One is choke, where at a particular operating pressure mass flow cannot be increased by increasing compressor speed. The other phenomena is surge, wherein at a defined operating pressure and flow rate the air does not have enough momentum to continue to overcome the pressure gradient at the compressor discharge and a flow reversal occurs. Both of these compressor phenomena may be modeled and predicted by the system defined herein. Other types of compressors may also be also be modeled by the system disclosed herein.

The simulation module 110 may be configured to model the entire compressor system including installation configuration and components upstream and downstream of the compressor. These components can include but are not limited to fluid conduits, heat exchangers, filters, valves, air/oil separators, fluid separators, dryers, etc. Because of the interaction between the compressor and system components, performance will change depending on the type and location of the compressor and variations of the system components. The simulation module 110 may be configured to predict the transient effects of the compressor on the system and the transient effects of the system on the compressor. This allows the simulation module 110 to determine where the compressor is operating relative to surge and choke at any point in time and allow certain operating parameters to be changed to keep the compressor out of surge and operating as efficiently as possible.

The computer further includes an analytics module 112 configured to receive and process the results of the one or more simulations on the compressed air system model from the simulation module 110. The analytics module 112 is further configured to request a demand profile of the compressed air system model from the user, such as by a GUI, for example, if the user has not already input the demand profile via the modeling GUI 400. The demand profile may include one or more usage parameters and/or load requirements demanded of the compressed air system, such as a storage capacity, an air demand amount, an energy cost rate, a power source type, an application type, and/or one or more schedule factors.

The analytics module 112 identifies one or more compressed air system optimization gaps or opportunities based on the demand profile and simulation results from the simulation module 110. The compressed air system optimization gaps may include an insufficient pressure, a high energy consumption, an undesired system condensation, and/or other identified compressed air system optimization gaps. It is contemplated that other optimization gaps may be identified. In certain embodiments, the database 105 at the model server 104 may further store iterations of previously saved simulation results and demand profiles. The analytics module 112 may be further configured to predict compressed air system optimization gaps based on the previously saved simulation results and demand profiles. The analytics module 112 may be used to perform preventive maintenance troubleshooting, root-cause analysis, and/or back solving for an air compression system.

The computer also includes a recommendations module 114 configured to receive and process the compressed air system optimization gaps from the analytics module 112. The recommendations module 114 identifies one or more recommendations, intended to improve or optimize the compressed air system model based on the optimization gaps. The recommendations may include an compressed air system pressure increase, a compressor duty cycle decrease, adding a dryer to the compressed air system, and/or adding a tank to the compressed air system. It is contemplated that other recommendations may be identified.

The recommendations module 114 is further configured to transmit the one or more recommendations to the sales quote server 106 and receive from the sales quote server 106 one or more sales quotes corresponding to the recommendations. The sales quotes may include, for example, a product list and a price corresponding to each product in the product list, each of which may be stored in the database 107 at the sales quote server 106. In certain embodiments, the recommendations module 114 is further configured to output the one or more recommendations and corresponding sales quotes to the user, such as by a GUI, for example. The recommendations module 114 may be further configured to retrieve and interpret previously saved simulation results, virtual models, and/or real time data from the database 105 at the model server 104 to recommend solutions to virtual and/or existing compressed air systems. The recommendations module 114 may be further configured to communicate with a GUI that communicates the simulation results, virtual models, real time data, recommendations, and/or sales quotes to the user, such as via a feedback GUI 502, which is discussed in further detail in the description of FIG. 5.

The analytics module 112 and/or the recommendations module 114 may have the ability to link into a manufacturing execution system (MES) to predict failures or poor quality. For example, the MES may be used to control compressed air equipment in a manufacturing plant. The analytics module 112 and/or the recommendations module 114 may be configured to determine how current equipment at the plant could be controlled differently to improve efficiency, performance, energy consumption, and/or reliability of the compressed air system in addition to quality, delivery, and cost of the user's final product. The analytics module 112 and/or the recommendations module 114 may also be configured to determine how new or different equipment could be used at the plant to improve efficiency, performance, energy consumption, and/or reliability of the compressed air system and thus the user's metrics of their final product.

The simulation module 110, the analytics module 112 and/or the recommendations module 114 may be configured to model, analyze, and recommend control(s) of individual components and/or compressed air systems and system controllers in order to improve performance and/or energy consumption. For example, the simulation module 110, the analytics module 112 and/or the recommendations module 114 may be used to determine a new or different set of control settings or control strategy that would improve the efficiency, performance, energy consumption, and/or reliability of one or more components of a compressed air system. For example, the simulation module 110, the analytics module 112 and/or the recommendations module 114 may be used to determine adjustments of interactions between equipment that would improve the efficiency, performance, energy consumption, and/or reliability of one or more components of a compressed air system. For example, the simulation module 110, the analytics module 112 and/or the recommendations module 114 may be used to determine performance predictions that may be used to improve the efficiency, performance, energy consumption, and/or reliability of one or more components of a compressed air system. Furthermore, the analytics module 112 and/or the recommendations module 114 may have the ability to learn as the number of simulations in the database grows and better predict or recommend system optimization techniques.

The computer 102 generally maintains a database 116. The database 116 may include one or more saved compressed air system models, real-time monitoring results, and/or compressed air system model simulation results. The saved compressed air system models, real-time monitoring results, and/or compressed air system model simulation results may be used by the analytics module 112 and/or the recommendations module 114 to predict compressed air system optimization gaps, opportunities, and/or recommend compressed air system solutions. It is contemplated that the database 116 may also contain a cached compressed air system component library for use when the computer 102 may be offline and/or unable to communicate with the model server 104.

Figure 2:
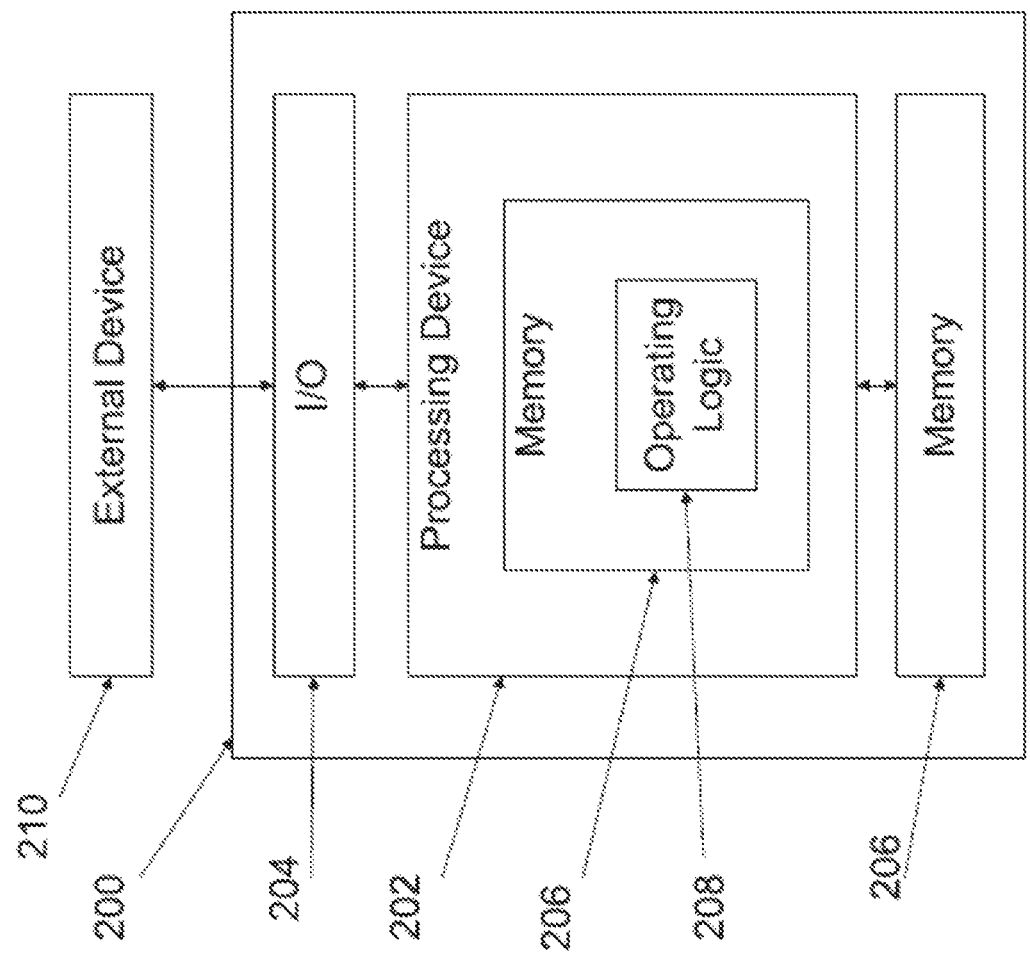
FIG. 2 is a schematic block diagram of an exemplary computing device.

FIG. 2 is a schematic block diagram of a computing device 200. The computing device 200 is one example of a computer or server that may be utilized in connection with the computer 102, the model server 104, and/or the sales quote server 106 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a mobile device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing.

Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
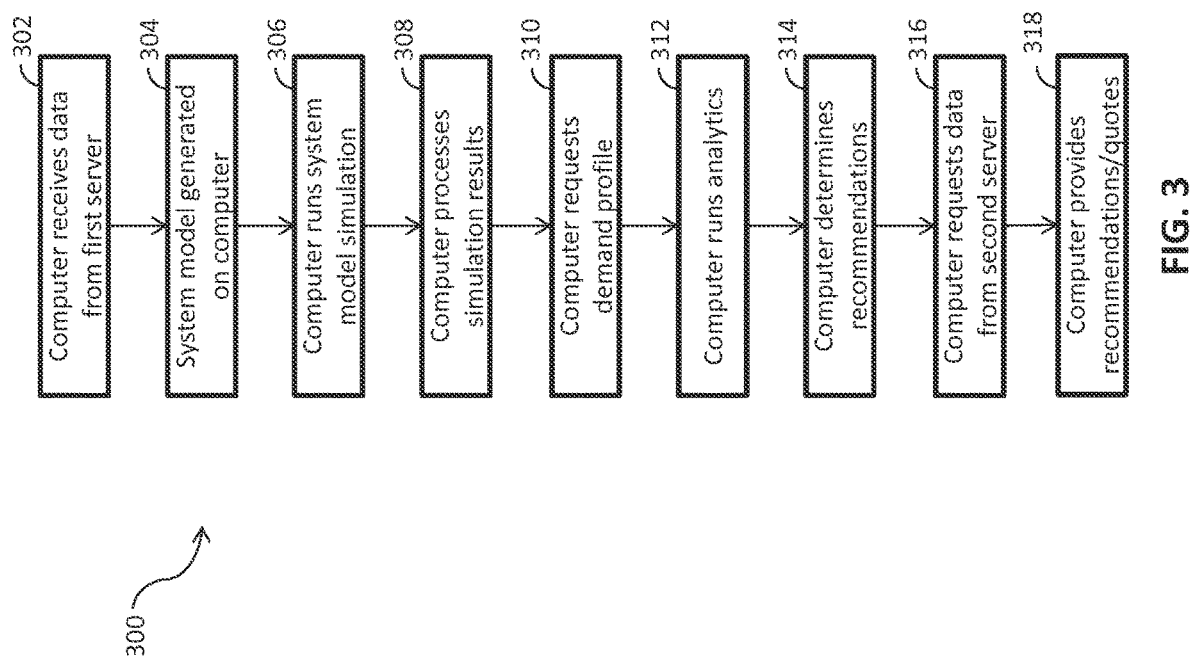
FIG. 3 is a schematic flow diagram of an exemplary process for determining and providing a recommendation and sales quote.

FIG. 3 illustrates a schematic flow diagram of an exemplary process 300 for providing recommendations and corresponding sales quotes for a system such as a compressed air system via a computer, such as the computer 102 discussed in FIG. 1. Operations illustrated for all of the processes in the present application are understood to be examples only, and operations may be combined or divided, and added or removed, as well as re-ordered in whole or in part, unless explicitly stated to the contrary.

It is contemplated that in certain embodiments process 300 may be started by a user initiated trigger, such as by the user starting an application and/or visiting a website. Process 300 starts at operation 302, where a computer (e.g., computer 102) receives data from a first server, such as the model server 104 discussed in FIG. 1. In certain embodiments, the data may be a library of compressed air system components, such as one or more compressors, dryers, tanks, pipes, regulators, and the like. After the computer 102 receives the data from the model server 104, process 300 continues to operation 304, where a user generates a compressed air system model based on the data from the model server 104 using the modeling module 108. In certain embodiments, the user may be presented with a GUI for selecting components to include in the compressed air system model. It is contemplated that in certain embodiments, where the computer 102 is not in communication with the first server (e.g., model server 104), the library of compressed air system components may be cached in a local storage 116 on the computer 102.

From operation 304, process 300 then continues to operation 306, where the simulation module 110 of the computer 102 runs a simulation of the compressed air system model based on the selected compressed air system model components selected from the library of compressed air system components by the user in operation 304. The simulation may be performed on system parameters, including pressure, flow, relative humidity, temperature, energy consumption, and/or other parameters. It is contemplated that one or more simulations may be run on the compressed air system model to simulate the behavior of the compressed air system model over a period of time and/or under certain conditions, for example various geographical locations, altitudes, pressures, and/or temperatures. Process 300 continues to operation 308, where the computer 102 processes the compressed air system model simulation results.

Process 300 continues to operation 310, where the computer 102 requests the user enter a demand profile of the compressed air system model generated at operation 304. In certain embodiments, the demand profile may be entered by the user via a GUI presented by the computer.

After receiving the demand profile, process 300 continues to operation 312, where the analytics module 112 of the computer 102 performs a series of analytic comparisons between the simulation results and the demand profile to determine a set of optimization gaps for the compressed air system model. The compressed air system optimization gaps based on the compressed air system model may include an insufficient pressure, a high energy consumption, an undesired condensation amount in the compressed air system, and/or other optimization gaps.

Process 300 then proceeds from operation 312 to 314, in which the recommendations module 114 of the computer 102 determines recommendations based on the optimization gaps. In certain embodiments, the set of recommendations may include an increase in the compressed air system pressure, a decrease in compressor duty cycle, adding a dryer to the compressed air system, adding a tank to the compressed air system, and/or other recommendations.

From operation 314, process 300 continues to operation 316, where the recommendations module 114 of the computer 102 requests data from a second server, such as the sales quote server 106 discussed in FIG. 1. In certain embodiments, the second server may provide sales quote data corresponding to the components in the set of recommendations determined in operation 312. It is contemplated that in certain embodiments the operations performed on the first and second server may be performed on a single server.

Process 300 then continues from operation 316 to operation 318, where the recommendations module 114 of the computer 102 provides the set of recommendations and the corresponding sales quote data to the user or another computer or server, such as via a GUI presented by the computer, email, and/or a printout, for example.

The various aspects of the process 300 in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the computer 102, model server 104, and/or sales quote server 106 performs the described operations when executing the computer program.

Figure 4:
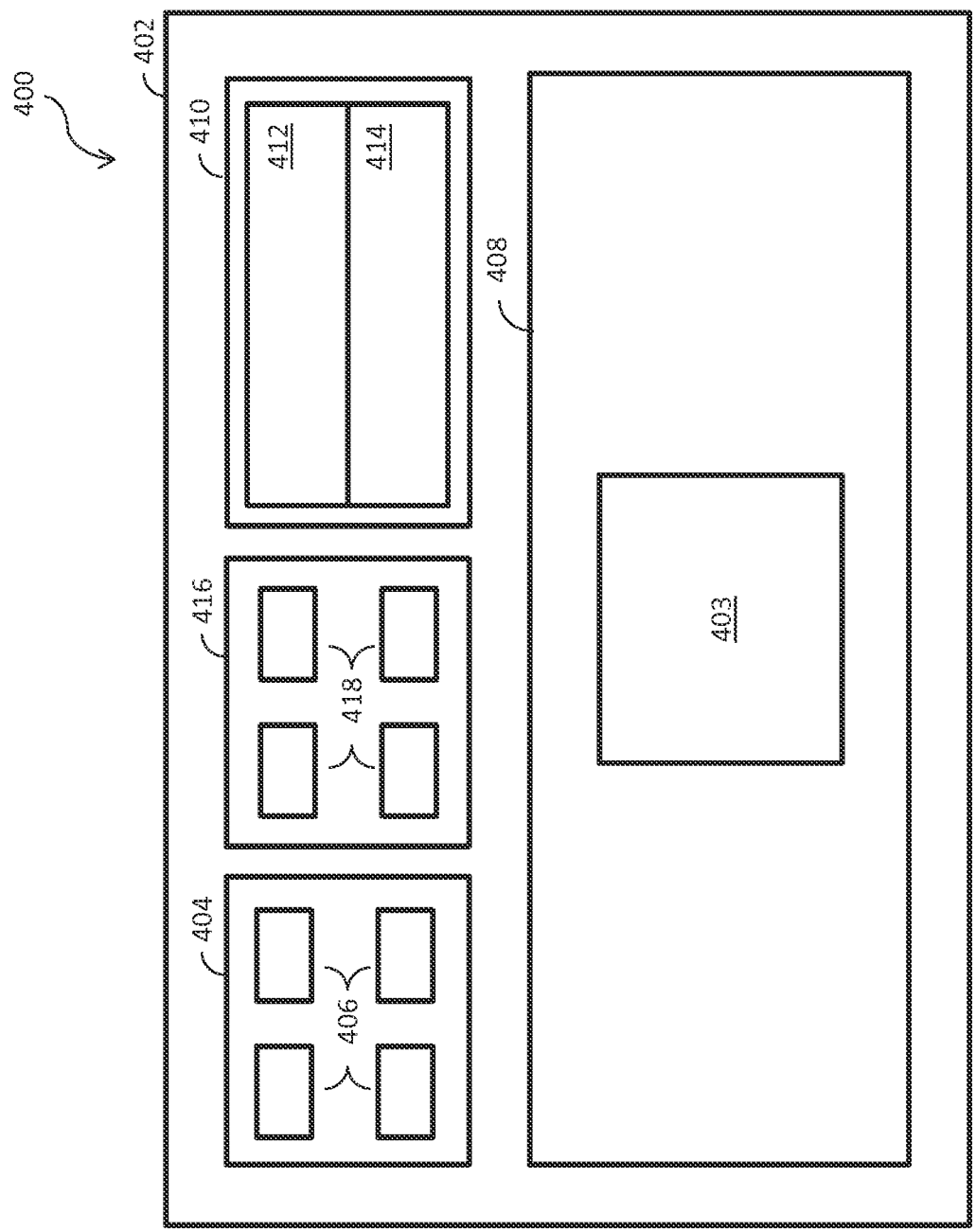
FIG. 4 is a schematic block diagram of an exemplary modeling GUI.

The GUI embodiments illustrated in FIGS. 4 and 5 are exemplary only, and other organizations, configurations, and arrangements of the elements illustrated and/or discussed are contemplated.

With reference to FIG. 4, there is illustrated an embodiment 400 of the modeling GUI 402 for modeling a virtual compressed air system 403 (i.e. a graphical depiction of a network of compressed air system components representative of a physical compressed air system). The modeling GUI 402 includes a compressed air system component library 404 including a set of component graphics 406. The components 406 may include compressors, dryers, tanks, pipes, regulators and/or other compressed air system components. It is contemplated that the compressed air system component library 404 may be received from the database 105 at the model server 104 and/or from the database 116 at the computer 102.

The modeling GUI 402 further includes a modeling canvas 408 in which to construct the virtual compressed air system 403 and a settings adjustment interface 410 for adjusting component and/or system settings. The modeling GUI 402 includes a template selection interface 416 including one or more predefined templates 418. The predefined templates may include component combination templates, such as a compressor and a pipe size, and/or system level templates, such as a pre-built common compressor room, a factory floor layout, and/or a header network, for example. It is contemplated that in certain embodiments the set of component graphics 406 and/or predefined templates 418 may be represented as icons, buttons, or any other type of textual and/or graphical representation configured to be user interfaceable.

The user can select one or more components from the component graphics 406 in the compressed air system component library 404 and place them onto the modeling canvas 408, where they can be moved around the modeling canvas 408 and inter-connected to form the virtual compressed air system 403. To select a component from the set of component graphics 406, the user may click on a component graphic 406. In one embodiment, the user may place the selected component onto the modeling canvas 408 by dragging the selected component graphic(s) 406 from the compressed air system component library 404 and dropping it onto the modeling canvas 408. In another embodiment, the user there may bring up a context menu, such as by right-clicking on the component graphic 406, for example, and selecting a context menu option to add the component to the modeling canvas 408. In still another embodiment, selecting a component may enable a button that, when clicked, adds the selected component to the modeling canvas 408. It is contemplated that multiple components may be modeled in parallel (i.e. multiple tanks, dryers, filters, etc.) that allow for a real time side-by-side comparison. It is further contemplated that any or all of the component placement embodiments herein described may be combined in a single embodiment. In certain embodiments, the virtual compressed air system 403 may only be simulated when the components are inter-connected to form a network representative of a physical compressed air system.

The settings adjustment interface 410 may include a system settings interface 412 and a selected component settings interface 414. Each compressed air system component may include component settings, such as one or more geometrical and/or performance parameters, that may be set using the selected component settings interface 414 of the settings adjustment interface 410. The component settings may include a compressor pressure set point, a dryer dew point, a flow demand, a humidity, a temperature, and/or other component specific settings. In certain embodiments, the component settings interface may be a dynamically changing interface, where only specific settings for the selected component are displayed and/or enabled.

The system settings for the virtual compressed air system 403 may be set using the system settings interface 412. The system settings may include pressure, flow, relative humidity, temperature, energy consumption, energy cost, atmospheric pressure, altitude, and the like. The system settings may further include a demand profile, which may include one or more usage parameters and/or load requirements demanded of the compressed air system, such as a storage capacity, an air demand amount, an energy cost rate, a power source type, an application type, a flow demand, and/or one or more schedule factors. The system settings may also include real-time settings data from an installation or facility.

The system and/or component settings may further include setting an operating condition for the system and/or component (e.g., a set of varying demand and transition settings for the system and/or components). The operating conditions may include varying demand from process equipment, compressors going from online at full flow to offline at zero flow, compressors going from offline at zero flow to online at full flow, desiccant dryer changeover, and/or other system and/or component level operating points and/or conditions.

In certain embodiments, the system and/or component settings may be input via real data from a compressed air system monitoring method, which may provide real-time settings or a historic set of demand data from the user's system and/or a like system, from a manual/offline user input method, by identifying air system components, such as scanning component specific barcodes of current air system components (e.g., on a plant floor), to automatically build the virtual compressed air system 403 as components are identified, and/or based on the demand profile and/or user specified requirements. The user specified requirements may include, but are not limited to, system layout, reliability, performance, and financial settings, such as a return on investment. It is contemplated that a user may use a barcode scanner to scan the current air system components. The barcode scanner may decode the barcode or send the barcode to a computer or server to be decoded. In some embodiments, the barcode scanner may be a smartphone with a barcode scanning app. The computer 102 may receive the barcode or the decoded barcode from the barcode scanner or from a server. The computer 102 may look up the compressed air system component(s) that corresponds to the barcode and include the corresponding virtual component into a virtual model that is being built for simulation.

In certain embodiments, when components are added to the virtual compressed air system 403, a rules check may be performed to ensure the user does not produce a potentially dangerous and/or unreliable compressed air system model. It is further contemplated that a rules check may be performed additionally or alternatively on a user initiated event, such as clicking a test button, for example, and/or on a non-user initiated event where the rules check is performed periodically and/or after a predetermined period of time has passed. In certain embodiments, the user may be notified of a rules check failure by being presented with an error message warning the user if the potentially dangerous and/or unreliable compressed air system model, for example.

Additional and/or alternative user controls for use in the modeling GUI 402 are contemplated. Such user controls include, but are not limited to, a Start/Stop button for starting and stopping a simulation of the virtual compressed air system 403, a clear button for clearing the virtual compressed air system components from the modeling canvas 408, one or more save buttons for saving the system settings interface 412 settings, the selected component settings interface 414 settings, and/or the virtual compressed air system 403. In certain embodiments, the user may be able to introduce faults into the virtual compressed air system 403 to show the effects thereof. Such faults may include dirty filters, faulty drain valves, rusted pipe, and/or the like. In certain other embodiments, the user may be able to model how moisture is brought back into the virtual compressed air system 403 from external sources and/or introduce seasonal and environmental effects. In still other embodiments, the user may be able to include any Newtonian fluid, such as for a virtual compressed air system that uses pneumatic power to operate pumps and/or other hydraulic equipment, for example.

In certain embodiments, the modeling GUI 402 may have a portion that receives a demand side performance from the user. The desired output performance may include a torque output, a force output, etc., such that the demand side performance may be used to determine flow and pressure requirements of the compressed air system, to which the virtual compressed air system 403 may be constructed by the modeling GUI 402 without further instruction from the user. In certain other embodiments, the modeling GUI 402 may have a portion that receives a number of drops from the user. The number of drops may be used to determine required components of the compressed air system, to which the virtual compressed air system 403 may be constructed by the modeling GUI 402 without further instruction from the user.

With reference to FIG. 5, there is illustrated an embodiment 500 of the feedback GUI 502 that includes a visual results interface 504, a financial results interface 506, and a system simulation results interface 508. The visual results interface 504 may include a visualization of the simulation results (i.e., pressure, flow, moisture content, energy consumption, etc. at any point in the system) in the form of videos, line graphs, bar graphs, gauges, tabulated data, and/or other data visualization technique.

The financial results interface 506 may include a bill of materials (BOM), a budgetary quote, a total cost of ownership (TCO), a return on investment (ROI), a sales quote including pricing details corresponding to each component in the simulated virtual compressed air system, and/or other financial data corresponding to the component and/or behavior of the simulated virtual compressed air system. The total cost of ownership may include the initial cost of purchase and installation of the equipment, the operating costs of the equipment, and/or the maintenance costs of the equipment.

The system simulation results interface 508 includes a visual layout of the simulated virtual compressed air system that may be zoomed in/out in order to identify particular components and/or arrangements. Compressed air systems include a supply side, which includes compressors and air treatment systems, and a demand side, which includes distribution and storage systems, as well as end-use equipment. In certain embodiments, the visual layout may provide a visual indicator distinguishing the supply side components and the demand side components, such as by a first color indicating the supply side and a second color indicating the demand side, for example. Further visual indicators may be provided in the visual layout, such as flow direction indicator, which may be represented by a series of arrows pointing in the direction of the flow at a size and/or color indicative of the pressure of the flow, for example.

Performance metrics and/or potential issues may be identified in the system simulation results interface 508. Performance metrics may include a compressor efficiency, an energy efficiency, a part load efficiency, a full load efficiency, a no load efficiency, a supply side efficiency, a demand side efficiency, and/or an overall system efficiency. The compressor efficiency may include a volumetric efficiency, an adiabatic efficiency, an isothermal efficiency, isentropic efficiency and/or a mechanical efficiency. It is contemplated that the efficiencies may be theoretical, ideal and/or based on empirical data. A supply side efficiency may include the system's ability to deliver clean, dry, and/or stable air at an appropriate pressure and/or in a cost-effective manner. A demand side efficiency may include the system's ability to minimize wasted air and use compressed air for the appropriate end-use applications. Potential issues may include compressed air lost in the form of unusable air, misuse, friction, vibration, incorrect capacity, incorrect pressure, maintenance costs, leakage, and/or noise. In certain embodiments, seasonal effects, environmental effects, and/or energy usage penalties on the simulated virtual compressed air system may be identified. It is contemplated that in certain embodiments a proposed solution/strategy may be identified in the system simulation results interface 508 based on the performance metrics, potential issues, seasonal effects, environmental effects, and/or energy usage penalties.

The feedback GUI 502 may include a means to return to the modeling GUI 402 referenced in FIG. 4, e.g., a button, to modify the virtual compressed air system. The feedback GUI 502 may further include a means to save at least a portion the data displayed in the feedback GUI 502. In certain embodiments, the displayed data may be saved in local memory on the computer 102 and/or saved remotely, such as at the model server 104, for example. The feedback GUI 502 may also include a means to export the data displayed in the feedback GUI 502. In certain embodiments, the data displayed in the feedback GUI 502 may be formatted and exported as a document, an email, and/or the like.

Various aspects of the systems, apparatus, and methods are disclosed herein. For example, one aspect involves a method, comprising: receiving, with a computing device, a component library; generating, with the computing device, a model of a system based on the component library; simulating, with the computing device, the model of the system to generate simulation data; determining, with the computing device, an optimization gap based on the simulation data and a demand profile; determining, with the computing device, a recommendation based on the optimization gap; and receiving, with the computing device, a sales quote for a product.

Features of the aspect may include: displaying the sales quote and the recommendation on a graphical user interface; transmitting the sales quote and the recommendation to another computing device via email; storing at least one of the component library, the model, and the simulation data in a database in the computing device; wherein the computing device receives the component library from a first server and wherein the computing device receives the sales quote from a second server; wherein the first server maintains a database of component libraries; wherein the second server generates the sales quote based on the recommendation; wherein the computing device receives the component library and the sales quote from one server; wherein the system is a compressed air system.

Another aspect of the present application may include: a system, comprising: a first computing device configured with non-transitory computer executable instructions to maintain a database of component libraries; a second computing device configured with non-transitory computer executable instructions to receive one of the component libraries from the first computing device, generate a model of a system based on the component library, simulate the model of the system to generate simulation data, determine an optimization gap based on the simulation data and a demand profile, determine a recommendation based on the optimization gap, and receive a sales quote for a product; and a third computing device configured with non-transitory computer executable instructions to generate the sales quote based on the recommendation and transmit the sales quote to the second computing device.

Features of the aspect may include: wherein the first computing device is a model server and the third computing device is a sales quote server, and wherein the model server and the sales quote server are part one server; wherein the first computing device is a model server and the third computing device is a sales quote server, and wherein the model server and the sales quote server are separate servers; wherein the second computing device is further configured to display the sales quote and the recommendation on a graphical user interface; wherein the second computing device is further configured to transmit the sales quote and the recommendation to a fourth computing device via email; wherein the second computing device further includes a database to store at least one of the component library, the model, and the simulation data.

Yet another aspect of the present application may include a computing device, comprising: a modeling module configured to receive a component library and generate a model of a system based on the component library; a simulation module configured to simulate the model of the system to generate simulation data; an analytics module configured to determine an optimization gap based on the simulation data and a demand profile; and a recommendation module configured to determine a recommendation based on the optimization gap and receive a sales quote for a product.

Features of the aspect of the present application may include: a graphical user interface to display the sales quote and the recommendation; wherein the recommendation module is further configured to transmit the sales quote and the recommendation to another computing device via email; a database to store at least one of the component library, the model, and the simulation data; wherein the system is a compressed air system.

Another aspect of the present application includes a method, comprising: receiving, with a computer, a set of library data relating to a compressed air system from a database at a first server; displaying, with a first graphical user interface (GUI) on the computer, a visual representation of each of the set of library data in a first portion of the GUI, a settings interface in a second portion of the GUI, and a modeling interface in a third portion of the GUI; receiving, through the GUI, a user initiated request to add at least a portion of the set library data to the second portion of the GUI to form a model of a compressed air system; receiving a demand profile from a user; receiving, through the GUI, a user initiated request to simulate the model; simulating the model of the system to generate simulation data; determining one or more optimization gaps based on the simulation data and a demand profile; determining a recommendation based on the one or more optimization gap; transmitting the recommendation to a second server; receiving a sales quote for one or more products from the second server based on the recommendation; displaying, with a second GUI on the computer, the simulation data, the sales quote, and the recommendation.

Features of the aspect may include: wherein the set of library data includes at least one of a component library and a template library; wherein the component library comprises a set of components relating to a compressed air system, wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein each component in the set of components includes one or more settings, and wherein the one or more settings includes at least one of a compressor pressure set point, a dryer dew point, a flow demand, a humidity, a temperature, an energy consumption, a pressure, a flow, a relative humidity, a temperature, and a component specific setting; wherein the template library comprises a set of templates relating to a compressed air system, wherein the set of templates includes at least one of a component combination template, a compressor room layout template, a factory floor layout template, and a header network template; wherein the visual representation includes at least one of an icon, a button, a textual representation, and a graphical representation; wherein the simulation data includes at least one of a transient pressure, a dynamic pressure, a flow, a moisture content, an energy consumption, and a financial reference; wherein the financial reference includes at least one of a bill of materials (BOM), a budget, a return on investment (ROI), and a total cost of ownership (TCO); further comprising transmitting the sales quote and the recommendation to another computing device via email; transmitting at least one of the model and the simulation to be saved on the first server.

Yet another aspect of the present application includes a system, comprising: a first computing device configured with non-transitory computer executable instructions to receive and maintain a first database that includes library data relating to a compressed air system; a second computing device configured with non-transitory computer executable instructions to receive at least a portion of the library data from the first computing device, display the library data in a graphical user interface (GUI), receive input through the GUI from a user to create a demand profile and generate a model of a system from the library data, simulate the model of the system to generate simulation data, determine one or more optimization gaps based on the simulation data and the demand profile, determine a recommendation based on the optimization gap, receive a sales quote for one or more products, and display the simulation data, the sales quote, and the recommendation; and a third computing device configured with non-transitory computer executable instructions to receive the recommendation, generate the sales quote based on the recommendation and transmit the sales quote to the second computing device.

Features of the aspect may include: wherein the first computing device is a first server and the third computing device is a second server, and wherein the first server and the second server are part of one server; wherein the first computing device is a first server and the third computing device is a second server, and wherein the first server and the second server are separate servers; wherein the first computing device is further configured receive and maintain at least one of a real-time data and a historical data; wherein the second computing device is further configured to receive and display, through the GUI, at least one of the real-time data and the historical data, and wherein the one or more optimization gaps are further determined based on at least one of the real-time data and the historical data; wherein the third computing device further includes a second database to store at least one of the component library, the model, and the simulation data.

Another aspect of the present application includes a computing device, comprising: a modeling module configured to receive a component library relating to a compressed air system and generate a model of a system based on the component library, the component library including a set of components relating to the compressed air system; a simulation module configured to simulate the model of the system to generate simulation data; an analytics module configured to determine an optimization gap based on the simulation data and a demand profile; a recommendation module configured to determine a recommendation based on the optimization gap and receive a sales quote for a product; and a first graphical user interface (GUI) configured to display the component library in a first portion of the GUI, the model of the system based on the component library in a second portion of the GUI, and the demand profile and one or more settings of the each of the set of components in the component library in a third portion of the GUI.

Features of the aspect may include: a second GUI to display the simulation data, the recommendation, and the sales quote; wherein the recommendation module is further configured to transmit the sales quote and the recommendation to another computing device via email; a database to store at least one of the component library, the model, and the simulation data; wherein the system is a compressed air system.

Another aspect of the present application includes: storing a component library relating to a compressed air system in a database at a server; receiving, with the server, a component library request from the computer to transmit at least a portion of the component library to the computer; and transmitting, with the server, at least a portion of the component library to the computer in response to the component library request.

Features of the aspect may include: wherein the component library includes at least one of a set of components relating to a compressed air system, one or more control settings for each of the set of components, and a template; wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein the one or more control settings includes at least one of a compressor pressure set point, a dryer dew point, a flow demand, a humidity, a temperature, an operating condition, and a component size; wherein the template includes at one of a component combination template, a pre-built common compressor room, a factory floor layout, and a header network; receiving, with the server, a data set from the computer; and storing the data set in the database at the server; receiving, with the server, a data set request from the computer to transmit at least a portion of the data set to the computer; and transmitting, with the server, at least a portion of the data set to the computer in response to the data set request; wherein the data set includes at least one of a simulation result relating to a simulation of a virtual model of a compressed air system, the virtual model of the compressed air system, and a real-time monitoring data set of a compressed air system; wherein the computer and the server communicate via a secure communication link.

Yet another aspect of the present application includes a system, comprising: a server configured with non-transitory computer executable instructions to store a component library relating to a compressed air system in a database at the server, to receive a component library request from a computing device to transmit at least a portion of the component library to the computing device, and to transmit at least a portion of the component library to the computing device in response to the component library request.

Features of the aspect may include: wherein the computing device is configured with non-transitory computer executable instructions to transmit the component library request to the server, to receive the component library from the server in response to the component library request, to simulate a virtual model of a compressed air system based on the component library, to generate a simulation result based on the simulating of the virtual model, and to transmit at least one of a simulation result relating to the simulating of the virtual model of the compressed air system, the virtual model of the compressed air system, and a real-time monitoring data set of the compressed air system to the server; wherein the component library includes at least one of a set of components relating to a compressed air system, one or more control settings for each of the set of components, and a template; wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein the one or more control settings includes at least one of a compressor pressure set point, a dryer dew point, a flow demand, a humidity, a temperature, an operating condition, and a component size; wherein the template includes at one of a component combination template, a pre-built common compressor room, a factory floor layout, and a header network.

Yet another aspect of the present application includes a method, comprising: transmitting, with a computer, a component library request to a server; receiving, with the computer, a component library from the server in response to the component library request; simulating, with the computer, a virtual model of a compressed air system based on the component library; generating, with the computer, a simulation result based on the simulating of the virtual model; and transmitting, with the computer, at least one of a simulation result relating to the simulating of the virtual model of the compressed air system, the virtual model of the compressed air system, and a real-time monitoring data set of the compressed air system to the server.

Another aspect of the present application includes a method, comprising: displaying, with a computer having a graphical user interface (GUI), a component library including a set of components relating to a compressed air system in a first portion of the GUI and a modeling interface for configuring a virtual model using the set of components in a second portion of the GUI; receiving, through the GUI, a component add request to add at least one of the set of components to the second portion of the GUI; adding the at least one of the set of components to the second portion of the GUI in response to the component add request; determining whether the component add request includes adding the at least one of the set of components to the virtual model; and interconnecting the at least one of the set of components with the virtual model when the component add request includes adding the at least one of the set of components to the virtual model.

Features of the aspect may include: receiving, through the GUI, a rule at least partially defining the at least one of the set of components added to the second portion of the GUI and the virtual model; performing a rules check for at least partially validating the at least one of the set of components added to the second portion of the GUI and the virtual model based on the rule; and generating a notification when the set of components added to the second portion being connected to the virtual model violates the rules check; establishing a communication link between the computer and a server; requesting the component library from a database on the server; and receiving the component library from the server; wherein the GUI further includes a third portion including a settings interface for adjusting one or more settings; receiving, through the GUI, an adjustment request to adjust one or more settings of a selected component in the virtual model; adjusting one or more settings based on the adjustment request; and configuring a compressed air system model on the second portion of the GUI based on the set of components added to the second portion of the GUI and the one or more settings adjusted on the third portion; wherein the one or more settings includes one or more component settings for each of the set of components on a first sub-portion of the third portion of the GUI, and the one or more component settings includes at least one of a compressor pressure set point, a dryer dew point, a flow demand, and a component operating condition; wherein the one or more settings includes one or more system settings for the compressed air system on a second sub-portion of the third portion of the GUI, and the one or more system settings includes at least one of a pressure, a flow, a relative humidity, a temperature, an energy consumption, an energy cost, and a system operating condition; receiving, through the GUI, a template add request to add one or more templates from a fourth portion of the GUI including a template library of selectable templates relating to a compressed air system; adding the one or more templates onto the second portion of the GUI; determining whether the template add request includes adding the one or more templates the virtual model; and interconnecting the one or more templates with the virtual model when the template add request includes adding the one or more templates to the virtual model; wherein the one or more templates includes at least one of a pre-built compressor room, a factory floor layout, a header network, and a compressed air system component combination; wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein the component add request includes at least one of a user selecting one of the set of components, and dragging and dropping one of the set of components on the second portion of the GUI.

Yet another aspect of the present application may include a computing device, comprising: a graphical user interface including a first portion and second portion, wherein the first portion is configured to display a component library including a set of components relating to a compressed air system, wherein the second portion includes a modeling interface to configure a virtual model using the set of components; and one or more processors configured with non-transitory computer executable instructions to receive a component add request to add at least one of the set of components to the second portion of the GUI, to add the at least one of the set of components to the second portion in response to the component add request, to determine whether the component add request includes adding the at least one of the set of components to the virtual model, and to interconnect the at least one of the set of components with the virtual model when the component add request includes adding the at least one of the set of components to the virtual model.

Features of the aspect may include: wherein the one or more processors are further configured to receive, through the graphical user interface, a rule at least partially defining the at least one of the set of components added to the second portion and the virtual model, to perform a rules check for at least partially validating the at least one of the set of components added to the second portion and the virtual model based on the rule, and generate a notification when the set of components added to the second portion being connected to the virtual model violates the rules check; wherein the graphical user interface further includes a third portion including a settings interface for adjusting one or more settings; wherein the one or more processors are further configured to receive, through the graphical user interface, an adjustment request to adjust one or more settings of a selected component in the virtual model, to adjust one or more settings based on the adjustment request, and configure a compressed air system model on the second portion of the graphical user interface based on the set of components added to the second portion of the graphical user interface and the one or more settings adjusted on the third portion; wherein the one or more settings includes one or more component settings for each of the set of components on a first sub-portion of the third portion, and the one or more component settings includes at least one of a compressor pressure set point, a dryer dew point, a flow demand, and a component operating condition; wherein the one or more settings includes one or more system settings for the compressed air system on a second sub-portion of the third portion, and the one or more system settings includes at least one of a pressure, a flow, a relative humidity, a temperature, an energy consumption, an energy cost, and a system operating condition; wherein the one or more processors are further configured to receive, through the graphical user interface, a template add request to add one or more templates from a fourth portion of the graphical user interface including a template library of selectable templates relating to a compressed air system, to add the one or more templates onto the second portion, and to determine whether the template add request includes adding the one or more templates the virtual model, and to interconnect the one or more templates with the virtual model when the template add request includes adding the one or more templates to the virtual model; wherein the computing device is one of a laptop computer, a desktop computer, and tablet computer.

Yet another aspect of the present application includes a method, comprising: performing, with a computer, a simulation of a virtual compressed air system, the virtual compressed air system including a set of components relating to a compressed air system; analyzing a simulation result of the simulation based on one or more settings of the virtual compressed air system and one or more settings of the set of components; calculating a financial reference based on the analyzed result; displaying, with a first portion of a graphical user interface (GUI) on the computer, a visual reference of the analyzed result; displaying, with a second portion of the GUI, the financial reference based on the analyzed result of the simulation; and displaying, with a third portion of the GUI, a schematic model of the virtual compressed air system.

Features of the aspect may include: wherein the result includes at least one of a pressure, a flow, a moisture content, and an energy consumption at any point of the simulation; wherein the visual reference includes at least one of a video, a graph, a gauge, a tabulated data display, and a flow diagram; wherein the financial reference includes at least one of a bill of materials (BOM), a budget, a return on investment (ROI), and a total cost of ownership (TCO); receiving, from an input device, a user command; and displaying only a subset of the schematic model of the virtual compressed air system based on the user command, wherein the user command includes at least one of a subset location, a subset size, a dimension, and a zoom magnification level; wherein displaying the subset of the schematic model comprises displaying the subset of the schematic model in a rectangular region superimposed on the third portion of the GUI; establishing a communication link between the computer and a server; requesting a sales quote from a database on the server based on the virtual compressed air system; and receiving the sales quote from the database, wherein the financial reference further includes the sales quote; establishing a communication link between the computer and a server; requesting a historical data set from a database on the server based on one or more previously saved simulation results; receiving the historical data set from the database; and wherein analyzing the simulation result is further based on the historical data; displaying, with a fourth portion of the GUI, a file menu that includes at least one of an export option and a save option; receiving, from an input device, a save command; establishing a communication link between the computer and a server; and transmitting at least one of the schematic model of the virtual compressed air system, the simulation result, and the financial reference to the server; receiving, from an input device, an export command; and exporting at least one of the schematic model of the virtual compressed air system, the simulation result, and the financial reference in an export format based on the export command; wherein the export format includes one of a locally saved document, a remotely saved document, and an email.

Another aspect of the present application includes a computing device, comprising: one or more processors configured with non-transitory computer executable instructions to perform a simulation of a virtual compressed air system that includes a set of components relating to a compressed air system, to analyze a result of the simulation based on one or more settings of the virtual compressed air system and one or more settings of the set of components, and to calculate a financial reference based on the analyzed result; and a graphical user interface including a first portion, a second portion, and third portion, wherein the first portion is configured to display a visual reference of the analyzed result, wherein the second portion is configured to display the financial reference based on the analyzed result of the simulation, and wherein the third portion is configured to display a schematic model of the virtual compressed air system.

Features of the aspect may include: wherein the graphical user interface further comprises a fourth portion having a file menu that includes at least one of an export option and a save option; wherein the one or more processors are further configured to establish a communication link between the computing device and a server in response to receiving a save command from a user input device, and wherein the processor is further configure to transmit at least one of the schematic model of the virtual compressed air system, the simulation result, and the financial reference to the server; wherein the one or more processors are further configured to export at least one of the schematic model of the virtual compressed air system, the simulation result, and the financial reference in an export format in response to receiving an export command from a user input device; wherein the export format includes one of a locally saved document, a remotely saved document, and an email; wherein the computing device is one of a laptop computer, a desktop computer, and tablet computer.

Another aspect of the present application may include a method, comprising: receiving, with a computer, a set of library data relating to a compressed air system from a database at a first server; displaying, with a first graphical user interface (GUI) on the computer, a visual representation of each of the set of library data in a first portion of the GUI, a settings interface in a second portion of the GUI, and a modeling interface in a third portion of the GUI; receiving, through the GUI, a user initiated request to add at least a portion of the set library data to the second portion of the GUI to form a model of a compressed air system; receiving a demand profile from a user; receiving, through the GUI, a user initiated request to simulate the model; simulating the model of the system to generate simulation data; determining one or more optimization gaps based on the simulation data and the demand profile; determining a recommendation based on the one or more optimization gap; transmitting the recommendation to a second server; receiving a sales quote for one or more products from the second server based on the recommendation; displaying, with a second GUI on the computer, the simulation data, the sales quote, and the recommendation.

Features of the aspect may include: wherein the set of library data includes at least one of a component library and a template library; wherein the component library comprises a set of components relating to a compressed air system, wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein each component in the set of components includes one or more settings, and wherein the one or more settings includes at least one of a compressor pressure set point, a dryer dew point, a flow demand, a humidity, a temperature, an energy consumption, a pressure, a flow, a relative humidity, a temperature, and a component specific setting; wherein the template library comprises a set of templates relating to a compressed air system, wherein the set of templates includes at least one of a component combination template, a compressor room layout template, a factory floor layout template, and a header network template; wherein the visual representation includes at least one of an icon, a button, a textual representation, and a graphical representation; wherein the simulation data includes at least one of a transient pressure, a dynamic pressure, a flow, a moisture content, an energy consumption, and a financial reference; wherein the financial reference includes at least one of a bill of materials (BOM), a budget, a return on investment (ROI), and a total cost of ownership (TCO); further comprising transmitting the sales quote and the recommendation to another computing device via email; transmitting at least one of the model and the simulation to be saved on the first server.

Yet another aspect of the present application may include a system, comprising: a first computing device configured with non-transitory computer executable instructions to receive and maintain a first database that includes library data relating to a compressed air system; a second computing device configured with non-transitory computer executable instructions to receive at least a portion of the library data from the first computing device, display the library data in a graphical user interface (GUI), receive input through the GUI from a user to create a demand profile and generate a model of a system from the library data, simulate the model of the system to generate simulation data, determine one or more optimizations based on the simulation data and the demand profile, determine a recommendation based on the optimizations, receive a sales quote for one or more products, and display the simulation data, the sales quote, and the recommendation; and a third computing device configured with non-transitory computer executable instructions to receive the recommendation, generate the sales quote based on the recommendation and transmit the sales quote to the second computing device.

Features of the aspect may include: wherein the first computing device is a first server and the third computing device is a second server, and wherein the first server and the second server are part of one server; wherein the first computing device is a first server and the third computing device is a second server, and wherein the first server and the second server are separate servers; wherein the first computing device is further configured to receive and maintain at least one of a real-time data and a historical data; wherein the second computing device is further configured to receive and display, through the GUI, at least one of the real-time data and the historical data, and wherein the one or more optimizations are further determined based on at least one of the real-time data and the historical data; wherein the third computing device further includes a second database to store at least one of the component library, the model, and the simulation data.

Another aspect of the present application may include a computing device, comprising: a processor and a memory including non-transitory computer executable instructions that when executed by the processor cause the computing device to: receive a component library relating to an HVAC system and generate a model of a customer system based on the component library, the component library including a set of components relating to the HVAC system; to simulate the model of the customer system to generate simulation data; determine an optimization based on the simulation data and a demand profile; determine a recommendation based on the optimization and receive a sales quote for a product; and generate and display a GUI with the component library in a first portion of the GUI, the model of the customer system based on the component library in a second portion of the GUI, and the demand profile and one or more settings of the each of the set of components in the component library in a third portion of the GUI.

Features of the aspect may include wherein the computing device is further structured to generate and display a second GUI with the simulation data, the recommendation, and the sales quote; wherein the computing device is further structured to transmit the sales quote and the recommendation to another computing device via email; a database to store at least one of the component library, the model, and the simulation data; wherein the optimization is based on real-time data and historical data.

Yet another aspect of the present application may include a method, comprising: displaying, with a computer having a graphical user interface (GUI), a component library including a set of components relating to a compressed air system in a first portion of the GUI and a modeling interface for configuring a virtual model using the set of components in a second portion of the GUI; receiving, through the GUI, a component add request to add at least one of the set of components to the second portion of the GUI; adding the at least one of the set of components to the second portion of the GUI in response to the component add request; determining whether the component add request includes adding the at least one of the set of components to the virtual model; interconnecting the at least one of the set of components with the virtual model when the component add request includes adding the at least one of the set of components to the virtual model; receiving and storing, with the computer, real-time monitoring data of an in-use compressed air system; and simulating the virtual model with the real-time monitoring data.

Features of the aspect may include: receiving, through the GUI, a rule at least partially defining the at least one of the set of components added to the second portion of the GUI and the virtual model; performing a rules check for at least partially validating the at least one of the set of components added to the second portion of the GUI and the virtual model based on the rule; and generating a notification when the set of components added to the second portion being connected to the virtual model violates the rules check; establishing a communication link between the computer and a server; requesting the component library from a database on the server; and receiving the component library from the server; wherein the GUI further includes a third portion including a settings interface for adjusting one or more settings; receiving, through the GUI, an adjustment request to adjust one or more settings of a selected component in the virtual model; adjusting one or more settings based on the adjustment request; and configuring a compressed air system model on the second portion of the GUI based on the set of components added to the second portion of the GUI and the one or more settings adjusted on the third portion; wherein the one or more settings includes one or more component settings for each of the set of components on a first sub-portion of the third portion of the GUI, and the one or more component settings includes at least one of a compressor pressure set point, a dryer dew point, a flow demand, and a component operating condition; wherein the one or more settings includes one or more system settings for the compressed air system on a second sub-portion of the third portion of the GUI, and the one or more system settings includes at least one of a pressure, a flow, a relative humidity, a temperature, an energy consumption, an energy cost, and a system operating condition; receiving, through the GUI, a template add request to add one or more templates from a fourth portion of the GUI including a template library of selectable templates relating to a compressed air system; adding the one or more templates onto the second portion of the GUI; determining whether the template add request includes adding the one or more templates the virtual model; and interconnecting the one or more templates with the virtual model when the template add request includes adding the one or more templates to the virtual model; wherein the one or more templates includes at least one of a pre-built compressor room, a factory floor layout, a header network, and a compressed air system component combination; wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein the component add request includes at least one of a user selecting one of the set of components, and dragging and dropping one of the set of components on the second portion of the GUI; scanning a barcode of an in-operation compressed air system; determining, with the computer, a virtual component based on the barcode; and interconnecting the virtual component to the virtual model.

Yet another aspect of the present application may include a method, comprising: performing, with a computer, a simulation of a virtual compressed air system using real-time monitoring data, the virtual compressed air system including a set of components relating to a compressed air system; analyzing a simulation result of the simulation based on one or more settings of the virtual compressed air system and one or more settings of the set of components; predicting component failures in the compressed air system based on the simulation result; calculating a financial reference based on the analyzed result; displaying, with a first portion of a graphical user interface (GUI) on the computer, a visual reference of the analyzed result; displaying, with a second portion of the GUI, the financial reference based on the analyzed result of the simulation; and displaying, with a third portion of the GUI, a schematic model of the virtual compressed air system.

Features of the aspect may include: wherein the simulation result includes at least one of a pressure, a flow, a moisture content, and an energy consumption at any point of the simulation; wherein the visual reference includes at least one of a video, a graph, a gauge, a tabulated data display, and a flow diagram; wherein the financial reference includes at least one of a bill of materials (BOM), a budget, a return on investment (ROI), and a total cost of ownership (TCO); receiving, from an input device, a user command; and displaying only a subset of the schematic model of the virtual compressed air system based on the user command, wherein the user command includes at least one of a subset location, a subset size, a dimension, and a zoom magnification level; wherein displaying the subset of the schematic model comprises displaying the subset of the schematic model in a rectangular region superimposed on the third portion of the GUI; establishing a communication link between the computer and a server; requesting a sales quote from a database on the server based on the virtual compressed air system; and receiving the sales quote from the database, wherein the financial reference further includes the sales quote; establishing a communication link between the computer and a server; requesting a historical data set from a database on the server based on one or more previously saved simulation results; receiving the historical data set from the database; and wherein analyzing the simulation result is further based on the historical data; displaying, with a fourth portion of the GUI, a file menu that includes at least one of an export option and a save option; receiving, from an input device, the save command; establishing a communication link between the computer and a server; and transmitting at least one of the schematic model of the virtual compressed air system, the simulation result, and the financial reference to the server; receiving, from an input device, the export command; and exporting at least one of the schematic model of the virtual compressed air system, the simulation result, and the financial reference in an export format based on the export command; wherein the export format includes one of a locally saved document, a remotely saved document, and an email; determining optimizations for the compressed air system based on the analyzed simulation result; displaying, with a third portion of the GUI, a schematic model of the virtual compressed air system and; wherein the computer is structured to provide better optimizations as the amount of historical data grows.

Yet another aspect of the present application may include a computing device, comprising: one or more processors configured with non-transitory computer executable instructions to perform a simulation of a virtual compressed air system that includes a set of components relating to a compressed air system, to analyze a result of the simulation based on one or more settings of the virtual compressed air system and one or more settings of the set of components, and to calculate a financial reference based on the analyzed result and to predict component failures; and a graphical user interface including a first portion, a second portion, and third portion, wherein the first portion is configured to display a visual reference of the analyzed result, wherein the second portion is configured to display the financial reference based on the analyzed result of the simulation, and wherein the third portion is configured to display a schematic model of the virtual compressed air system.

Features of the aspect may include: wherein the graphical user interface further comprises a fourth portion having a file menu that includes at least one of an export option and a save option; wherein the one or more processors are further configured to establish a communication link between the computing device and a server in response to receiving a save command from a user input device, and wherein the processor is further configure to transmit at least one of the schematic model of the virtual compressed air system, the simulation result, and the financial reference to the server; wherein the one or more processors are further configured to export at least one of the schematic model of the virtual compressed air system, the simulation result, and the financial reference in an export format in response to receiving an export command from a user input device; wherein the export format includes one of a locally saved document, a remotely saved document, and an email; wherein the computing device is one of a laptop computer, a desktop computer, and tablet computer.

Another aspect of the present application may include a computing device, comprising: a graphical user interface including a first portion and second portion, wherein the first portion is configured to display a component library including a set of components relating to a compressed air system, wherein the second portion includes a modeling interface to configure a virtual model using the set of components; and one or more processors configured with non-transitory computer executable instructions to receive a component add request to add at least one of the set of components to the second portion of the GUI, to add the at least one of the set of components to the second portion in response to the component add request, to determine whether the component add request includes adding the at least one of the set of components to the virtual model, to interconnect the at least one of the set of components with the virtual model when the component add request includes adding the at least one of the set of components to the virtual model, to store real-time monitoring data of a currently used compressed air system, and to simulating the virtual model with the real-time monitoring data.

Features of the aspect may include: wherein the one or more processors are further configured to receive, through the graphical user interface, a rule at least partially defining the at least one of the set of components added to the second portion and the virtual model, to perform a rules check for at least partially validating the at least one of the set of components added to the second portion and the virtual model based on the rule, and generate a notification when the set of components added to the second portion being connected to the virtual model violates the rules check; wherein the graphical user interface further includes a third portion including a settings interface for adjusting one or more settings; wherein the one or more processors are further configured to receive, through the graphical user interface, an adjustment request to adjust one or more settings of a selected component in the virtual model, to adjust one or more settings based on the adjustment request, and configure a compressed air system model on the second portion of the graphical user interface based on the set of components added to the second portion of the graphical user interface and the one or more settings adjusted on the third portion; wherein the one or more settings includes one or more component settings for each of the set of components on a first sub-portion of the third portion, and the one or more component settings includes at least one of a compressor pressure set point, a dryer dew point, a flow demand, and a component operating condition; wherein the one or more settings includes one or more system settings for the compressed air system on a second sub-portion of the third portion, and the one or more system settings includes at least one of a pressure, a flow, a relative humidity, a temperature, an energy consumption, an energy cost, and a system operating condition; wherein the one or more processors are further configured to receive, through the graphical user interface, a template add request to add one or more templates from a fourth portion of the graphical user interface including a template library of selectable templates relating to a compressed air system, to add the one or more templates onto the second portion, and to determine whether the template add request includes adding the one or more templates the virtual model, and to interconnect the one or more templates with the virtual model when the template add request includes adding the one or more templates to the virtual model; wherein the computing device is one of a laptop computer, a desktop computer, and tablet computer.

Another aspect of the present application may include a method, comprising: receiving, with a computer, a set of library data relating to a compressed air system from a database at a first server; displaying, with a first graphical user interface (GUI) on the computer, a visual representation of each of the set of library data in a first portion of the GUI, a settings interface in a second portion of the GUI, and a modeling interface in a third portion of the GUI; receiving, through the GUI, a user initiated request to add at least a portion of the set library data to the second portion of the GUI to form a model of a compressed air system; receiving a demand profile from a user; receiving, through the GUI, a user initiated request to simulate the model; simulating the model of the system to generate simulation data; determining one or more optimization gaps based on the simulation data and the demand profile; and determining a recommendation based on the one or more optimization gap, wherein the recommendation includes at least one of recommending new equipment to be used in the compressed air system and recommending a change in control settings for the compressed air system.

Features of the aspect may include: wherein the component library comprises a set of components relating to a compressed air system, wherein the set of components includes at least one of a compressor, a dryer, a filter, a regulator, a pipe, a pipe fitting, a point-of-use tool, a hose, a valve, a drain, an air receiver, a separator, a lubricator, a cooler, a safety device, a treatment component, and a customizable component; wherein each component in the set of components includes one or more settings, and wherein the one or more settings includes at least one of a compressor pressure set point, a dryer dew point, a flow demand, a humidity, a temperature, an energy consumption, a pressure, a flow, a relative humidity, a temperature, and a component specific setting; wherein the visual representation includes at least one of an icon, a button, a textual representation, and a graphical representation; wherein the simulation data includes at least one of a transient pressure, a dynamic pressure, a flow, a moisture content, an energy consumption, and a financial reference; wherein simulation data includes at least one of a bill of materials (BOM), a budget, a return on investment (ROI), and a total cost of ownership (TCO); wherein the recommendation further includes a sales quote based on the simulation data; predicting component failures in the compressed air system based on the simulation data.

Yet another aspect of the present application may include a computing device, comprising: a graphical user interface (GUI) including a first portion and second portion, wherein the first portion is configured to display a component library including a set of components relating to a compressed air system, wherein the second portion includes a modeling interface to configure a virtual model using the set of components; and one or more processors configured with non-transitory computer executable instructions to receive a component add request to add at least one of the set of components to the second portion of the GUI, to add the at least one of the set of components to the second portion in response to the component add request, to determine whether the component add request includes adding the at least one of the set of components to the virtual model, to interconnect the at least one of the set of components with the virtual model when the component add request includes adding the at least one of the set of components to the virtual model, to store real-time monitoring data of a currently used compressed air system, to simulate the virtual model with the real-time monitoring data to generate simulation data, to determine one or more optimizations based on the simulation, to determine one or more recommendations based on the optimizations, wherein the one or more recommendations include at least one of a change of control strategy, a redesign of a layout of the compressed air system, and new equipment to be used in the compressed air system.

Feature of the aspect of the present application may include: wherein the simulation data includes at least one of a transient pressure, a dynamic pressure, a flow, a moisture content, an energy consumption, and a financial reference; wherein the add request includes a barcode of component of the compressed air system scanned by a mobile barcode scanner; wherein the computing device is one of a laptop computer, a desktop computer, and tablet computer; predicting component failures in the compressed air system based on the simulation data; wherein the change of control strategy includes reprogramming a compressed air system controller; wherein the recommendation further includes a sales quote based on the simulation data.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   collecting, with a sensor, real-time monitoring data regarding a compressed air system;
   electronically conveying the real-time monitoring data to a computer;
   performing, with the computer, a simulation of a virtual compressed air system using the real-time monitoring data, the virtual compressed air system including a set of components relating to a compressed air system;

analyzing a simulation result of the simulation based on one or more settings of the virtual compressed air system and one or more settings of the set of components;

predicting component failures in the compressed air system based on the simulation result;

calculating a financial reference based on the analyzed result;

displaying, within a first portion of a graphical user interface (GUI) on the computer in which the first portion includes a defined first boundary, a visual reference of the analyzed result;

displaying, within a second portion of the GUI in which the second portion includes a defined second boundary, the financial reference based on the analyzed result of the simulation contemporaneous with the visual reference of the analyzed result being displayed within the first boundary of the first portion; and displaying, within a third portion of the GUI in which the third portion includes a defined third boundary, a schematic model of the virtual compressed air system contemporaneous with the financial reference of the analyzed result being displayed within the second boundary of the second portion.

2. The method of claim 1, wherein the simulation result includes at least one of a pressure, a flow, a moisture content, and an energy consumption at any point of the simulation.

3. The method of claim 1, wherein the visual reference includes at least one of a video, a graph, a gauge, a tabulated data display, and a flow diagram.

4. The method of claim 1, wherein the financial reference includes at least one of a bill of materials (BOM), a budget, a return on investment (ROI), and a total cost of ownership (TCO).

5. The method of claim 1, further comprising:
receiving, from an input device, a user command; and
displaying only a subset of the schematic model of the virtual compressed air system based on the user command,
wherein the user command includes at least one of a subset location, a subset size, a dimension, and a zoom magnification level.

6. The method of claim 5, wherein displaying the subset of the schematic model comprises displaying the subset of the schematic model in a rectangular region superimposed on the third portion of the GUI.

7. The method of claim 1, further comprising:
establishing a communication link between the computer and a server;
requesting a sales quote from a database on the server based on the virtual compressed air system; and
receiving the sales quote from the database,
wherein the financial reference further includes the sales quote.

8. The method of claim 1, further comprising:
establishing a communication link between the computer and a server;
requesting a historical data set from a database on the server based on one or more previously saved simulation results;
receiving the historical data set from the database; and
wherein analyzing the simulation result is further based on the historical data.

9. The method of claim 1, further comprising:
displaying, with a fourth portion of the GUI, a file menu that includes at least one of an export option and a save option.

10. The method of claim 9, further comprising:
receiving, from an input device, the save command;
establishing a communication link between the computer and a server; and
transmitting at least one of the schematic model of the virtual compressed air system, the simulation result, and the financial reference to the server.

11. The method of claim 9, further comprising:
receiving, from an input device, the export command; and
exporting at least one of the schematic model of the virtual compressed air system, the simulation result, and the financial reference in an export format based on the export command.

12. The method of claim 11, wherein the export format includes one of a locally saved document, a remotely saved document, and an email.

13. The method of claim 1, further comprising:
determining optimizations for the compressed air system based on the analyzed simulation result;
displaying, with a third portion of the GUI, a schematic model of the virtual compressed air system and;
wherein the computer is structured to provide better optimizations as the amount of historical data grows.

14. A computing device, comprising:
one or more processors configured with non-transitory computer executable instructions to electronically receive real-time monitoring data regarding a compressed air system; to perform a simulation of a virtual compressed air system that includes a set of components relating to the compressed air system using the real-time monitoring data, to analyze a result the simulation based on one or more settings of the virtual compressed air system and one or more settings of the set of components, to calculate a financial reference based on the analyzed result, and to predict component failures; and
a graphical user interface (GUI) including a first portion, a second portion, and third portion, wherein the first portion is configured to display a visual reference of the analyzed result, wherein the second portion is configured to display the financial reference based on the analyzed result of the simulation, wherein the third portion is configured to display a schematic model of the virtual compressed air system, and wherein the first portion, second portion, and third portion are defined within a static first boundary, static second boundary, and static third boundary, respectively, wherein the second portion is displayed contemporaneously with the visual reference of the analyzed result being displayed within the first boundary of the first portion, and wherein the third portion is displayed contemporaneously with the financial reference of the analyzed result being displayed within the second boundary of the second portion.

15. The computing device of claim 14, wherein the graphical user interface further comprises a fourth portion having a file menu that includes at least one of an export option and a save option.

16. The computing device of claim 15, wherein the one or more processors are further configured to establish a communication link between the computing device and a server in response to receiving a save command from a user input device, and wherein the processor is further configure to transmit at least one of the schematic model of the virtual compressed air system, the simulation result, and the financial reference to the server.

17. The computing device of claim 15, wherein the one or more processors are further configured to export at least one of the schematic model of the virtual compressed air system, the simulation result, and the financial reference in an export format in response to receiving an export command from a user input device.

18. The computing device of claim 15, wherein the export format includes one of a locally saved document, a remotely saved document, and an email.

19. The computing device of claim 14, wherein the computing device is one of a laptop computer, a desktop computer, and tablet computer.

20. The computing device of claim 14, wherein the simulation performed is a real-time simulation.

* * * * *